(12) United States Patent
Dhaliwal et al.

(10) Patent No.: US 11,707,677 B2
(45) Date of Patent: *Jul. 25, 2023

(54) VISUALIZATION SYSTEM FOR CREATING A MIXED REALITY GAMING ENVIRONMENT

(71) Applicant: Aristocrat Technologies Australia Pty Limited, North Ryde (AU)

(72) Inventors: Upinder Dhaliwal, Sydney (AU); Thomas Elson, North Ryde (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 17/650,204

(22) Filed: Feb. 7, 2022

(65) Prior Publication Data
US 2022/0152499 A1 May 19, 2022

Related U.S. Application Data

(63) Continuation of application No. 16/947,684, filed on Aug. 12, 2020, now Pat. No. 11,266,907.

(30) Foreign Application Priority Data
Aug. 12, 2019 (AU) .............................. 2019902910

(51) Int. Cl.
*A63F 13/537* (2014.01)
*G07F 17/32* (2006.01)

(52) U.S. Cl.
CPC ........ *A63F 13/537* (2014.09); *G07F 17/3211* (2013.01); *A63F 2300/8082* (2013.01)

(58) Field of Classification Search
CPC ........... A63F 13/537; A63F 2300/8082; G07F 17/3211; G07F 17/32; G06F 3/04815; G06T 19/006

See application file for complete search history.

(56) References Cited

U.S. PATENT DOCUMENTS

| | | |
|---|---|---|
| 9,165,421 B2 | 10/2015 | Lyons |
| 9,511,291 B2 | 12/2016 | Lyons |
| 9,558,612 B2 | 1/2017 | Lyons |

(Continued)

OTHER PUBLICATIONS

Office Action (Notice of Allowance and Fees Due (PTOL-85)) dated Nov. 16, 2021 for U.S. Appl. No. 16/947,684 (pp. 1-8).

(Continued)

*Primary Examiner* — Seng H Lim
(74) *Attorney, Agent, or Firm* — Weaver Austin Villeneuve & Sampson LLP

(57) ABSTRACT

A virtualization system is that comprises a display configured to display a representation of a real-world gaming area with physical objects. A user selects and adds one or more virtual electronic gaming machines (EGMs) to the gaming area representation to generate a mixed reality gaming area. Each virtual EGM added to the mixed reality gaming area can be moved to a desired location and rotated to a desired orientation. Each virtual EGM added to the to the mixed reality gaming area is also shown implementing a game that may also be selected by the user. The user is provided with a representation on the tablet computer of the mixed reality gaming area that includes the specific EGMs implementing the specific game, where the specific EGMs can be added or replaced at one or more virtual locations.

20 Claims, 13 Drawing Sheets

(56) References Cited

U.S. PATENT DOCUMENTS

| | | |
|---|---|---|
| 9,626,807 B2 | 4/2017 | Lyons |
| 9,865,125 B2 | 1/2018 | Lyons |
| 10,134,195 B2 | 11/2018 | Lyons |
| 10,134,229 B2 | 11/2018 | Lyons |
| 2013/0281206 A1 | 10/2013 | Lyons |
| 2013/0281207 A1 | 10/2013 | Lyons |
| 2013/0281208 A1 | 10/2013 | Lyons |
| 2013/0281209 A1 | 10/2013 | Lyons |
| 2014/0302915 A1 | 10/2014 | Lyons |
| 2015/0126279 A1 | 5/2015 | Lyons |
| 2020/0051371 A1 | 2/2020 | Nelson |
| 2020/0118380 A1 | 4/2020 | Nelson |

OTHER PUBLICATIONS

Office Action (Notice of Allowance and Fees Due (PTOL-85)) dated Dec. 3, 2021 for U.S. Appl. No. 16/947,684 (pp. 1-2).

VISUALIZATION SYSTEM FOR CREATING A MIXED REALITY GAMING ENVIRONMENT

CROSS REFERENCE TO RELATED APPLICATIONS

This application is a continuation under 35 U.S.C. § 120 of U.S. patent application Ser. No. 16/947,684, filed Aug. 12, 2020, titled "VISUALIZATION SYSTEM FOR CREATING A MIXED REALITY GAMING ENVIRONMENT," and which claims the benefit of priority to Australian Provisional Patent Application Serial No. 2019902910, filed Aug. 12, 2019 and entitled "A Visualization System," and is related to Australian Patent Application Serial No. 2020217382, filed Aug. 12, 2020 and entitled "A Visualization System," all of which are hereby incorporated by reference herein in their entireties and for all purposes.

FIELD

The present application relates to a visualization system for visualizing electronic gaming machines (EGMs) in a mixed reality gaming environment.

BACKGROUND

EGMs or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (return to player (RTP)) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

Typically, multiple EGMs of different types and/or that implement different games are disposed on a gaming area managed for example by a casino operator, and the casino operator selects the EGMs, the games that are implemented and the locations of the EGMs on the gaming area according to defined criteria.

However, it is often difficult for operators of a gaming area to visualize how a gaming area will look and what the practical effect will be if one or more new EGMs are disposed at particular locations on the gaming area.

SUMMARY

A virtualization system is described that can be used with a tablet computer. A representation of a real-world gaming area with physical objects are captured and displayed on the tablet computer, and a user is able to select and add one or more virtual EGM(s) to the gaming area representation to generate a mixed reality gaming area. Each virtual EGM added to the mixed reality gaming area can be moved to a desired location and rotated to a desired orientation. Each virtual EGM added to the to the mixed reality gaming area is also shown implementing a game that may also be selected by the user. The user is provided with a representation on the tablet computer of the mixed reality gaming area that includes the specific EGM(s) implementing the specific game, where the specific EGMs can be added or replaced at one or more virtual locations.

A visualization system is described that comprises a display arranged to display a representation of a real-world gaming area configured to accommodate at least one electronic gaming machine, and a data storage device. The system also comprises EGM data indicative of the appearance of at least one real-world electronic gaming machine, the EGM data stored in the data storage device, and game data indicative of at least one game, the game data stored in the data storage device. The system is arranged to add at least one virtual EGM to the representation of the real-world gaming area in response to user input, each virtual EGM corresponding to stored EGM data representative of a real-world gaming machine, and each virtual EGM implementing a game corresponding to stored game data. The system is also configured to facilitate selection by the user of the location and orientation of the added at least one virtual EGM. The displayed representation of the real-world gaming area and the displayed at least one virtual EGM provide the user with an indication as to how the real-world gaming area will appear if at least one EGM corresponding to the at least one virtual EGM that implements a game is added to the real-world gaming area.

A visualization system is described that comprises at least one display, and a game controller that includes at least one processor and at least one memory device. The at least one processor, the at least one memory device, and the at least one display are operably connected, and the at least one memory device stores computer-readable instructions for controlling the at least one processor to display a representation of a real-world gaming area configured to accommodate at least one EGM, and store EGM data indicative of the appearance of at least one real-world electronic gaming machine in a data storage device. The processor is also controlled to store game data indicative of at least one game in the data storage device, and, in response to user input, add at least one virtual EGM to the representation of the real-world gaming area, each virtual EGM corresponding to stored EGM data representative of a real-world gaming machine, and each virtual EGM implementing a game corresponding to stored game data. The processor is also controlled to facilitate selection by the user of the location and orientation of the added at least one virtual EGM. The displayed representation of the real-world gaming area and the displayed at least one virtual EGM provide the user with an indication as to how the real-world gaming area will appear if at least one EGM corresponding to the at least one virtual EGM and implementing the game is added to the real-world gaming area.

A visualization method is described that comprises displaying a representation of a real-world gaming area configured to accommodate at least one electronic gaming machine, storing EGM data indicative of the appearance of at least one real-world EGM in a data storage device, and storing game data indicative of at least one game in the data storage device. The method also comprises, in response to user input, adding at least one virtual EGM to the representation of the real-world gaming area, each virtual EGM corresponding to stored EGM data representative of a physical world gaming machine, and each virtual EGM implementing a game corresponding to stored game data. The method also comprises facilitating selection by the user of the location and orientation of the added at least one virtual EGM. The displayed representation of the physical world gaming area and the displayed at least one virtual EGM provide the user with an indication as to how the real-world gaming area will appear if at least one EGM corresponding to the at least one virtual EGM and implementing the game is added to the real-world gaming area.

In one or more implementations, each of the above described methods, and variations thereof, may be implemented as a series of computer executable instructions executed on a programmable electronic device. Such instructions may use any one or more convenient programming language. Such instructions may be collected into engines and/or programs and stored in any computer-readable medium or media that is readable and executable by a computer system, gaming device, or other programmable electronic device.

DETAILED DESCRIPTION

Figure 1:
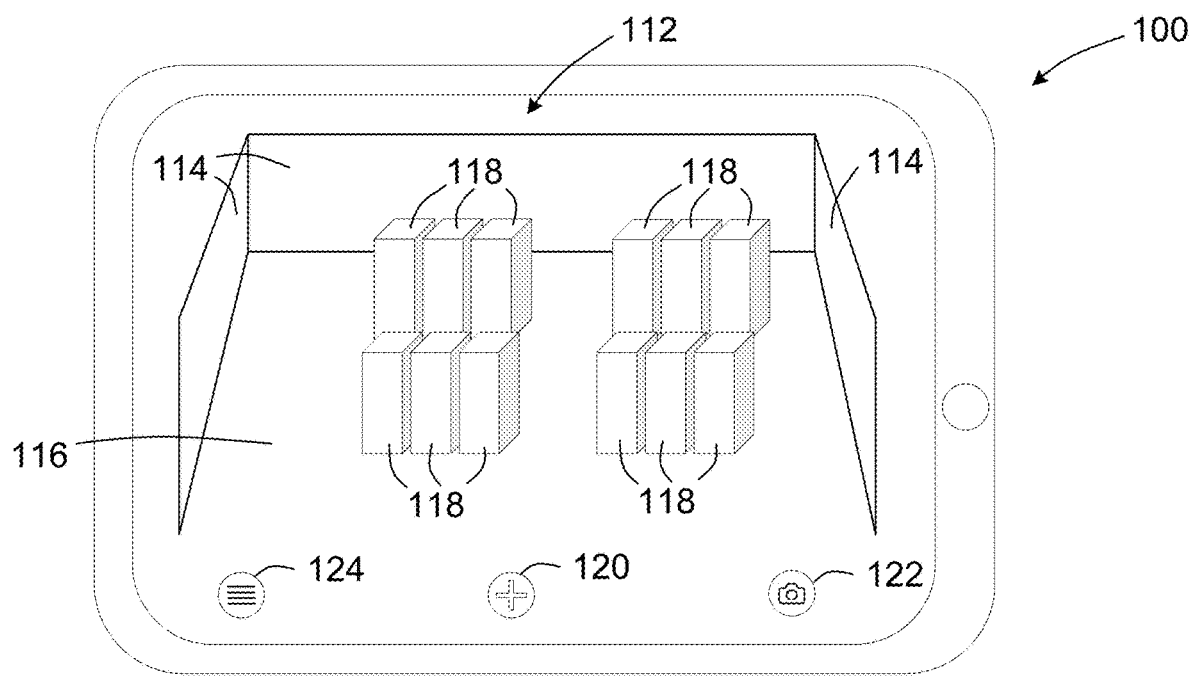
FIG. 1 is a diagrammatic representation of a visualization system in accordance with an embodiment of the present invention, the system implemented using a tablet computer.

The disclosure includes various example implementations that executes a gaming product application on an electronic device to generate a mixed reality gaming area. Specifically, the gaming product application generates a user interface (UI) for editing and/or modifying virtual and/or physical gaming devices within the mixed reality gaming area. In one or more implementations, the UI is presented on an opaque display that provides a real time representation (e.g., images, frames, or video) of a real-world gaming area. The UI can transform the real-world gaming area into a mixed reality gaming area by allowing a user to select, add, and superimpose one or more virtual gaming devices (e.g., EGMs) over the real-world gaming area. The UI allows for each virtual gaming device added to the mixed reality gaming area to be moved to a designated location and rotated to a designated orientation. The UI can also allow for editing and/or modification functionality that include overlaying real time execution of and/or pre-recorded games on the virtual gaming device, scanning virtual gaming devices and/or physical gaming devices to be added or matched with a product catalogue database, copying virtual gaming devices that have already been added to and/or scanned within the mixed reality gaming area, modifying the appearance of the virtual gaming devices, and/or saving and sharing mixed reality gaming areas to other users with other user accounts and/or other devices. As an example, the user provides the representation on a tablet computer of a mixed reality gaming area with one or more virtual EGMs presenting one or more games, where the virtual EGMs can be added, replaced, and/or copied to one or more virtual locations.

In terms of technical effects, implementations described throughout the disclosure delivers improvements to UI design, productizing gaming device, and/or building out a mixed reality gaming environment by providing new and/or improved mixed reality functionality for a variety of different uses. Specifically, the game productized application provides new and/or improved functionality to quickly edit (e.g., copy) and modify attributes of virtual gaming devices and physical gaming devices using a UI design. Modifications, customizations, and utilization of virtual gaming devices are done in real-time and can exploit a product catalogue database locally stored on the electronic device and/or at a remote computing device (e.g., server). By providing a variety of edit and modification functionality, the game productized application can be applied to a variety of uses, such as engineering design, development, and visualizations, interactive product demonstrations, and interactive gameplay experiences. These and other technical features are described in greater detail later in the disclosure.

For purposes of this disclosure, the term "real-world gaming area" refers to a physical gaming environment that users can sense and/or interact without the assistance of electronic devices. In other words, users can directly sense and/or interact with the physical gaming environment using the users' senses, for example, through sight, touch, hearing, taste, and smell. Real-world gaming areas, such as physical casinos, include physical objects, such as lights, building structures, gaming devices, and physical patrons. Within this disclosure the term "real-world gaming area" can also be referred to and interchanged with the terms "real-world gaming environment," "physical gaming environment," and "physical gaming area" or can be more generally referred to as "real-world area" or "physical environment."

Conversely, the term "mixed reality gaming area" refers to a generated virtual environment configured to integrate one or more sensory inputs from the physical gaming environment or representations thereof with virtual based sensory inputs, such as virtual objects. Generally, a mixed reality gaming environment can fall anywhere between without including an entirely physical environment and a completely virtual reality environment. In some mixed reality gaming environments, virtual based sensory inputs may respond to changes in sensory inputs from the physical gaming environment. Also, some electronic devices for presenting a mixed reality gaming environment may track a virtual object's orientation and location in relation to the physical gaming environment to allow for interaction with one or more physical objects. For example, a tablet computer may account for movements so that a virtual gaming device object appears stationery with respect to the physical ground plane. One example of a mixed reality environment is augmented reality. Within this disclosure the term "mixed reality gaming area" can also be referred to and interchanged with the term "mixed reality gaming environment" or can be more generally referred to as a "mixed reality area" or "mixed reality environment."

Within this disclosure, the term "augmented reality gaming area" refers to a type of mixed reality gaming area where one or more virtual objects are superimposed over a physical gaming environment. As an example, an electronic device can present an augmented reality gaming area with a transparent or translucent display such that a user is able to view at least a portion of the physical gaming environment. The electronic device can present one or more virtual objects on the transparent or translucent display allowing a user to view the superimposed virtual objects over the physical gaming environment. In another example, the electronic device includes an opaque display and one or more imaging sensors that capture one or more images and/or frames of the physical gaming environment. The images and/or videos of the physical gaming environment are representations of the physical gaming environment that are presented on the opaque display. A user indirectly views the physical gaming environment by viewing the images and/or videos, and perceives the virtual objects superimposed over the physical gaming environment. Additionally, or alternatively, an electronic device may be a projection system that projects virtual objects into the physical gaming environment, for example, as a hologram, so that a user perceives the virtual objects superimposed over the physical gaming environment.

FIGS. 1 to 8 show a visualization system implemented using a computing device that in this example is a tablet computer 100. However, it will be understood that other computing devices are envisaged, such as a smartphone or a laptop computer. It is also envisaged that the computing device may operate independently or with a further computing device in networked communication with the computing device. It will also be understood that instead of using a generic computing device, one or more dedicated hardware devices may be used that are specifically configured and include dedicated hardware and software components to implement the functionality of the visualization system.

As shown in FIG. 1, a tablet computer 100 is shown that presents on a UI a gaming area representation 112 of a real-world gaming area, for example, associated with a casino operator. In FIG. 1, the tablet computer 100 displays the UI and gaming area representation 112 on an opaque display. The tablet computer 100 captures and presents gaming area representation 112 in real time as described later in relation to FIGS. 16 and 17. In one or more implementations, the captured gaming area representation 112 is derived directly from one or more cameras and/or other image capturing systems that are part of and/or connected to the tablet computer 100. In other words, gaming area representation 112 is an image and/or video that constitutes a live viewpoint of the real-world gaming area at a specific location and orientation.

To present gaming area representation 112 on a UI of tablet computer 100, tablet computer 100 loads and executes a gaming product application. When executing the gaming product application, a user logs in with an associated user account to access one or more product catalogue databases of virtual EGMs stored on the tablet computer 100 and/or obtained (e.g., downloaded or real time streaming) from a remote computing device (e.g., a server). After logging in, the user is able to add one or more virtual EGMs to the gaming area representation 112 to generate a mixed reality gaming area that presents how the real-world gaming area will appear with an added EGM by selecting an add EGM button 120. A snapshot of the gaming area representation 112 shown on the tablet computer 100 may be captured and stored locally at the tablet computer 100 or remotely by activating a capture screen button 122.

Figure 2:
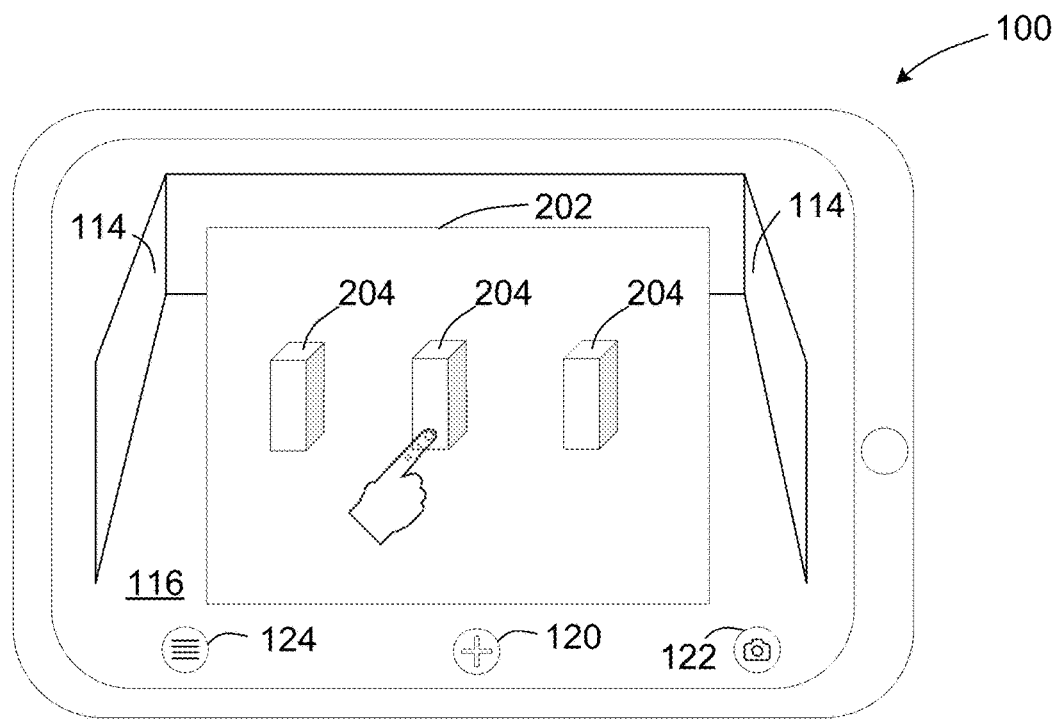
FIG. 2 is a diagrammatic representation of the visualization system shown in FIG. 1 during selection of an EGM type.

Selection of the add EGM button 120 causes an EGM type selection box 202 to be displayed, as shown in FIG. 2. The EGM type selection box 202 includes several types of EGM 204 that are selectable by a user, for example using a tap gesture. The EGM type selection box 202 can pull its virtual EGM data and/or models locally and/or remotely.

In this example, the selected EGM type to add is a Helix™ model gaming device manufactured by Aristocrat® Technologies, Inc., although it will be understood that any type of EGM is envisaged.

Figure 3:
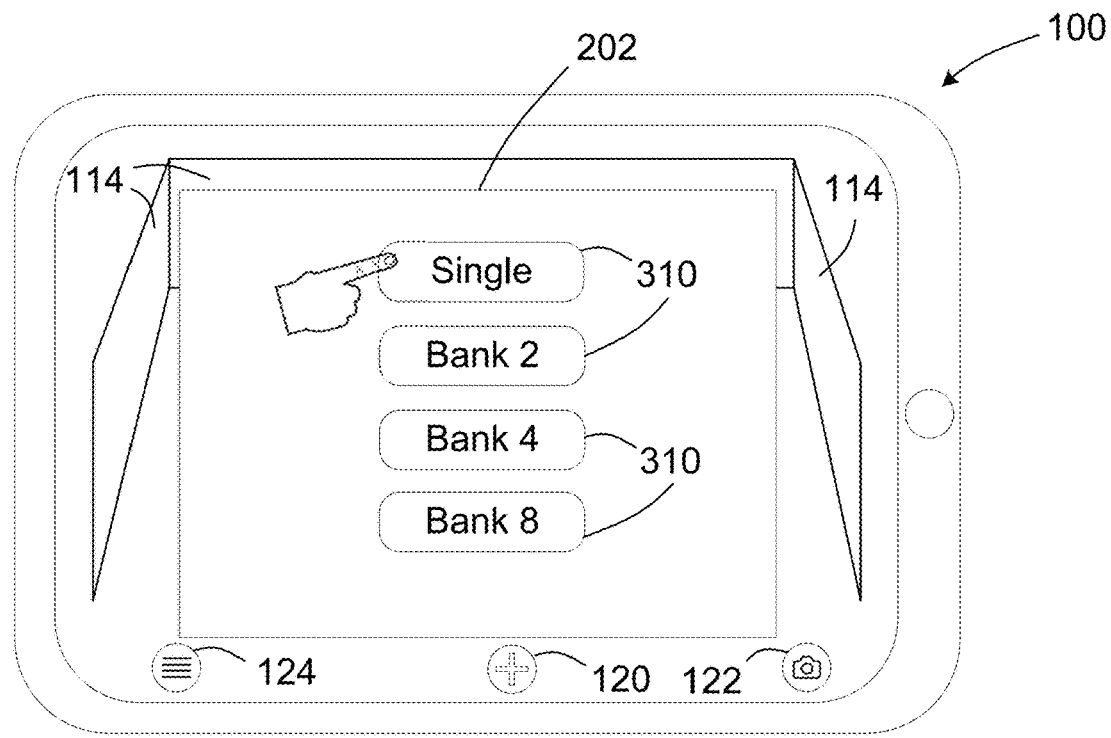
FIG. 3 is a diagrammatic representation of the visualization system shown in FIGS. 1 and 2 during selection of an EGM bank type.

After selection of the EGM type, an EGM bank type selection box 302 is displayed, as shown in FIG. 3. Using the EGM bank type selection box 302, the user is able to select an EGM bank type, in this example a single bank, a double bank, a 4 bank or an 8 bank, using bank selection buttons 310, for example using a tap gesture.

Figure 4:
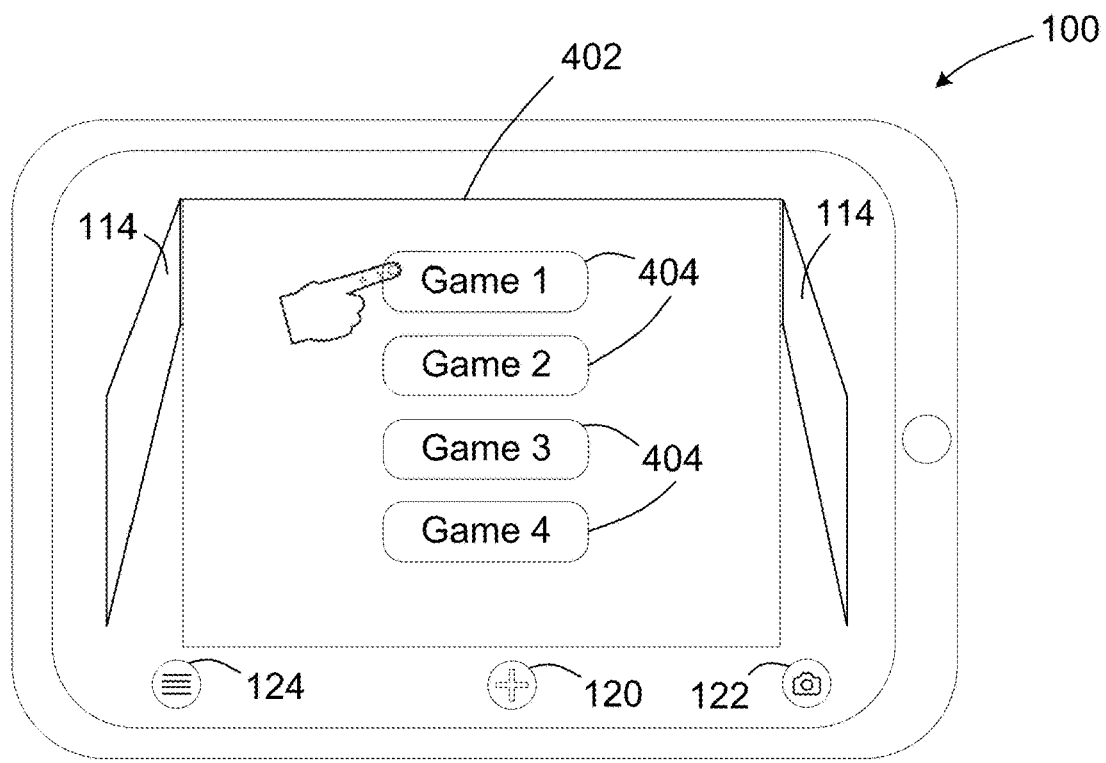
FIG. 4 is a diagrammatic representation of the visualization system shown in FIGS. 1 to 3 during selection of a game for association with the added EGM(s).
Figure 5:
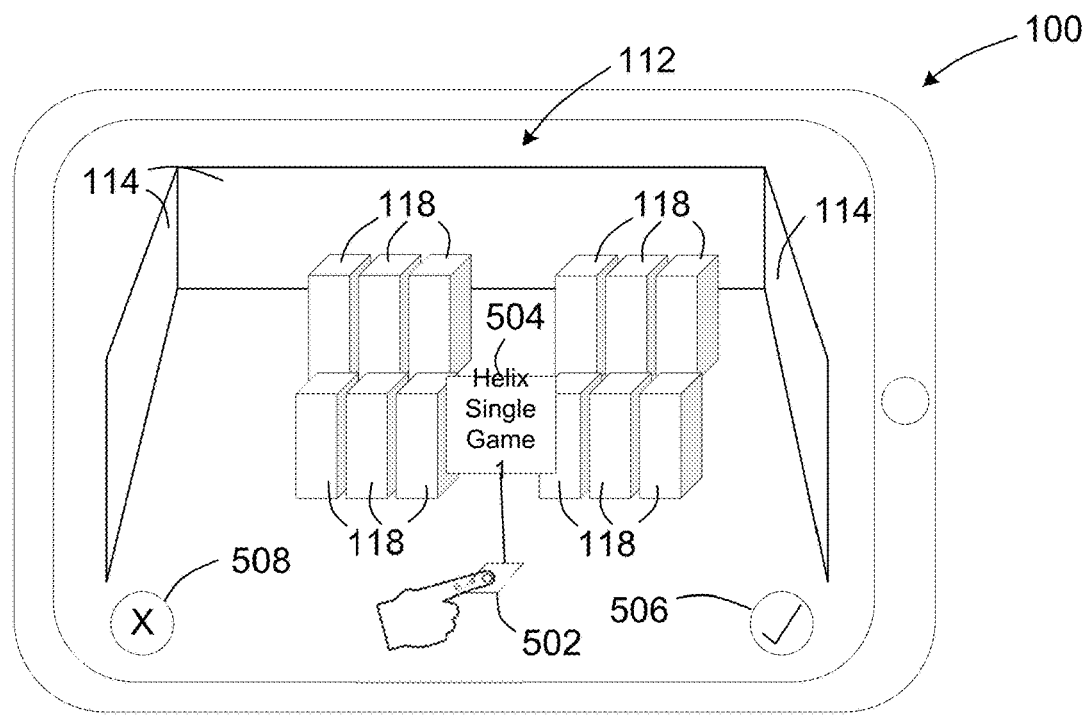
FIG. 5 is a diagrammatic representation of the visualization system shown in FIGS. 1 to 4 after selection of the EGM(s) and before selection of a location for the EGM(s).

After selection of the EGM bank type, a game selection box 402 is displayed, as shown in FIG. 4. Using the game selection box 402, the user is able to select a game to be shown on the bank of selected EGMs using game selection buttons 404, for example using a tap gesture. The games available for selection would typically be based on the selected EGM type, current location of the tablet computer 100, user account information and/or other application parameters since corresponding real-world EGM types and/or regions typically have a particular set of games that are available for play. In other words, the gaming product application can include a set of rules and/or policies that govern what games are available for selection.

In one or implementations, after selection of an EGM type by a user, EGM type data indicative of the EGM type is loaded into a cache of the tablet computer 100. The EGM type data is then used to identify the games that are available for play on the selected EGM type, and the identified games are made available for selection by the user. Selection of one of the games by the user causes data indicative of the selected game to be loaded and displayed on the selected EGM.

After selection of the game, an EGM footprint marker 502 is displayed on the gaming area representation 112, the EGM footprint marker 502 representing the footprint area or volume taken up by the selected bank of EGM(s) on the gaming area representation. The EGM footprint marker 502 may be displayed as a partially opaque polygon, such as a 50% transparent grey object, overlaying the gaming area representation 112. In one example, the partially opaque polygon is a parallelogram whose boundary is indicative of a footprint area of the selected bank of EGM(s). In another example, the partially opaque polygon is a 6-sided polygon whose boundary is indicative of a footprint volume of the selected bank of EGM(s). The EGM footprint marker 502 has an associated banner 504 that includes information indicative of the selected EGM type, bank type and game. The user is able to move the EGM footprint marker 502 and rotate the EGM footprint marker 502, for example using suitable touch gestures. The EGM footprint marker 502 serves to guide and/or inform the user of the aligned placement of the selected bank of EGM(s) with any displayed EGM(s) (real-world or virtual) and/or with objects surrounding the gaming area before being accepted for addition to the gaming area representation 112. Using accept button 506 and decline button 508, the user is able to accept the selected EGM(s) for addition to the gaming area representation 112 or reject the selected EGM(s).

Figure 6:
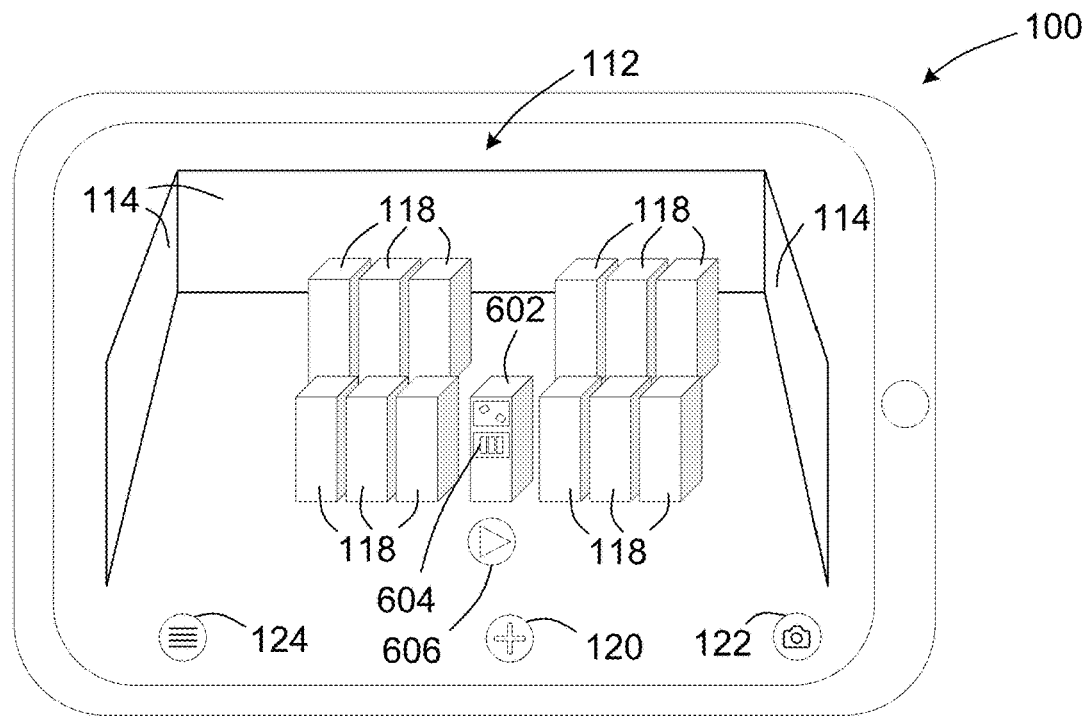
FIG. 6 is a diagrammatic representation of the visualization system shown in FIGS. 1 to 5 after selection of the location for the EGM(s).

If the selected EGM(s) is/are accepted, a virtual EGM bank that visually replicates the selected EGM(s) is displayed on the gaming area representation 112 at the location and orientation selected by the user, as shown in FIG. 6. Each virtual EGM of the virtual EGM bank includes a representation 604 of the selected game. In the described example, the representation 604 is initially displayed as static graphic and is configured to display dynamic graphics upon user interaction. The static graphic may be derived from a screenshot of the selected game, whereas the dynamic graphic may be derived from a pre-recorded video or real-time play of the game. The tablet computer 100 may be configured to scale the screenshot and/or pre-recorded video to the dimensions and orientation of the representation 604 to accommodate the user's viewing distance and viewing angle of the virtual EGM bank 602.

By selecting a play button 606, the user is able to cause a game or pre-recorded video (or their scaled derivatives) to play on each virtual EGM of the virtual EGM bank, so that the user is provided with a representation of how the real-world gaming area represented by the gaming area representation 112 would look and optionally sound if a new bank of one or more virtual EGMs is added and a specific game is implemented on the selected virtual EGMs.

Figure 7:
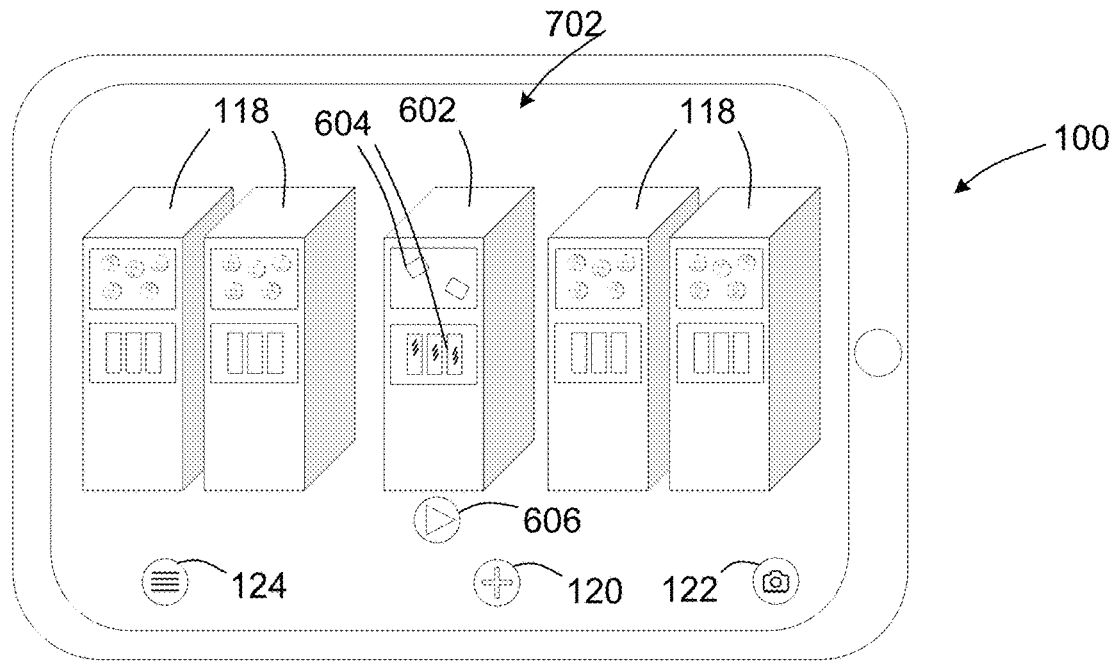
FIG. 7 is a representation of an enlarged view of a portion of a representation of a gaming area shown in FIG. 6.

As shown in FIG. 7, the user is able to enlarge the representation shown on the tablet computer 100, for example using typical touch gestures, so that, for example, a selected portion 702 of the gaming area representation is shown. In this example, the portion 702 of the gaming area representation shown in FIG. 7 shows the added single EGM bank and representations of adjacent real-world EGMs 118. In this example, selection of the play button 606 also causes audio corresponding to the implemented game to be played on the tablet computer 100. In an alternative implementation, the game or pre-recorded video of the game may play in response to the relative size of the virtual EGM on the screen of the tablet computer 100, virtual location of the virtual EGM in relation to the virtual location of the tablet computer 100, and/or movement of the tablet computer 100 within the mixed reality environment. For example, as the user zooms the view on the tablet computer screen towards a particular virtual EGM or bank of virtual EGMs, the game may start to play when a defined zoom distance is reached. In another example, when a user walks by and/or approaches a virtual EGM, the tablet computer 100 can play sounds associated with the game that overlays on the virtual EGM. By doing so, the tablet computer 100 creates an interactive experience that targets a user's interest and does not overwhelm the senses of the user.

Figure 8:
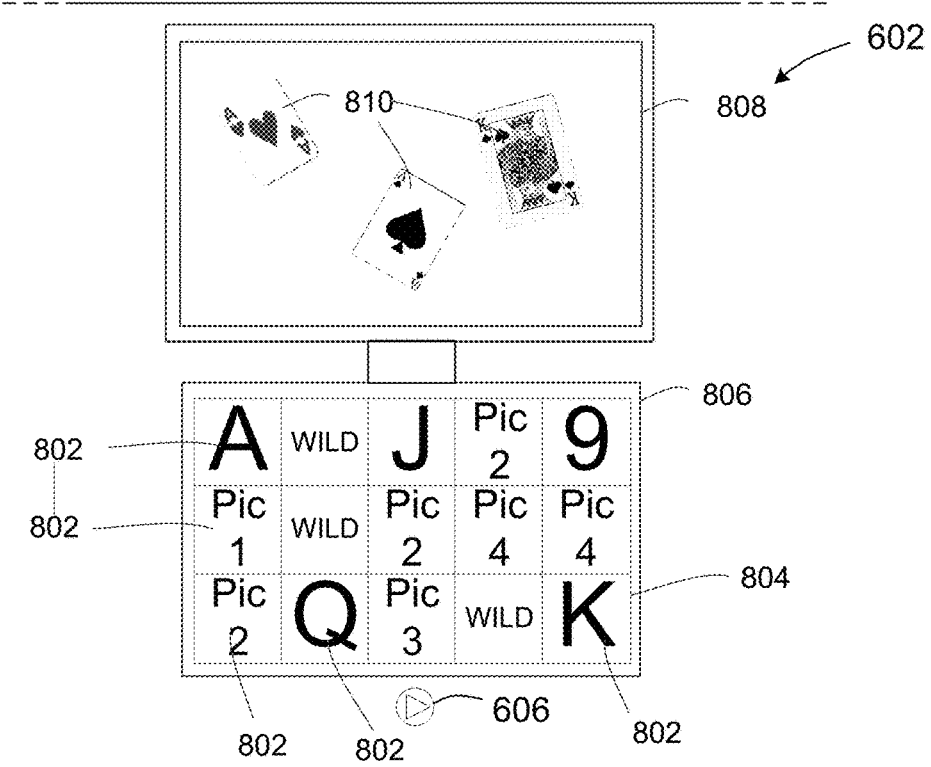
FIG. 8 is a representation of a further enlarged view of a portion of the representation of a gaming area shown in FIGS. 6 and 7.

A further enlarged representation is shown in FIG. 8 that shows the added single virtual EGM bank. As shown in FIG. 8, the game implemented on the virtual EGM 602 is a spinning reel game wherein several symbols 802 are randomly selected and displayed in a symbol matrix 804 on a symbol display screen 806. The virtual EGM shown in FIG. 8 also includes a top screen 808 that in this example is arranged to display indicia 810 representative of the game.

It will be understood that the visualization system in this example is an augmented reality type implementation wherein a user is present at a gaming venue and the screen of the tablet computer 100 displays live images of the real-world gaming area derived from a camera of the tablet computer 100 and representations of added virtual EGMs. In a mixed reality environment, the tablet computer 100 acts a virtual viewpoint with a corresponding virtual location and orientation.

Figure 9:
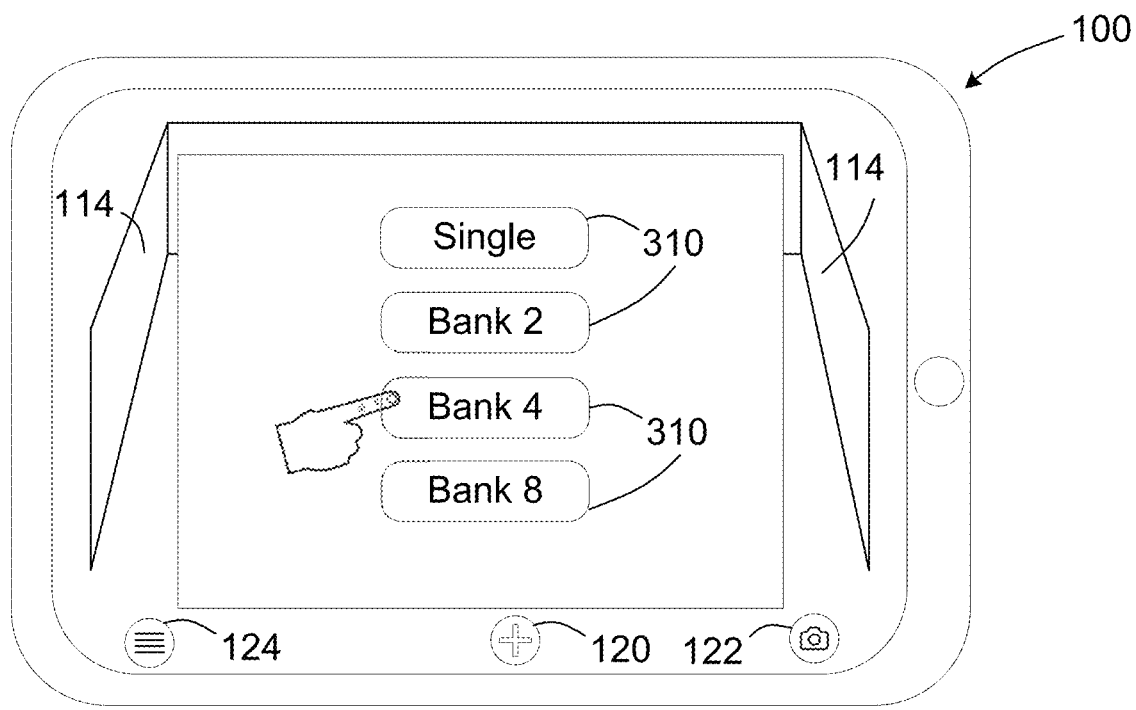
FIG. 9 is a diagrammatic representation of the visualization system shown in FIGS. 1 to 3 during selection of a different EGM bank type.
Figure 10:
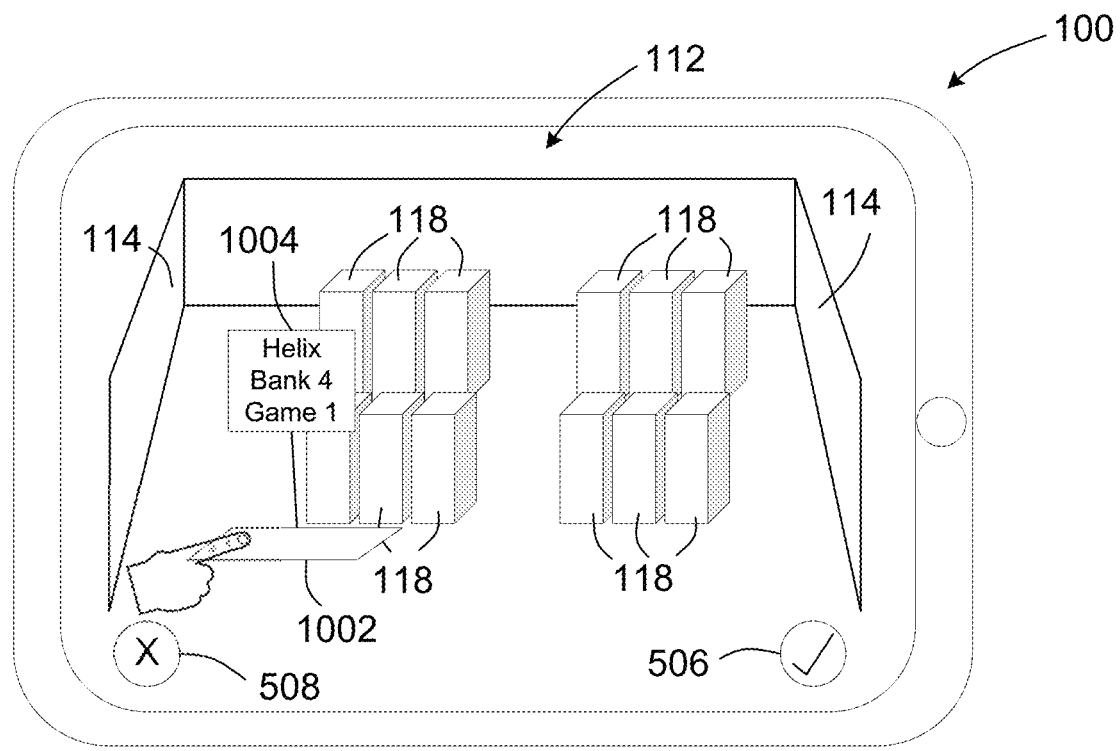
FIG. 10 is a diagrammatic representation of the visualization system shown in FIG. 9 after selection of the EGM type, the EGM bank type and the game, and before selection of a location for the EGM bank.

FIGS. 9 and 10 shown an alternative virtual bank of EGMs, in this example a bank of four EGMs. As shown, after selection of a bank of four EGMs using the bank selection buttons 310, an EGM footprint marker 1002 is displayed on the gaming area representation 112, the EGM footprint marker 1002 representing the footprint area taken up by the selected bank of 4 EGM(s) on the gaming area representation 112. The EGM footprint marker 1002 has an associated banner 1004 that includes information indicative of the selected EGM type, bank type and game. Since a bank of four EGMs has been selected, the EGM footprint marker 1002 is larger than the EGM footprint marker 502 for the selected single EGM bank shown in FIG. 5.

Figure 11:
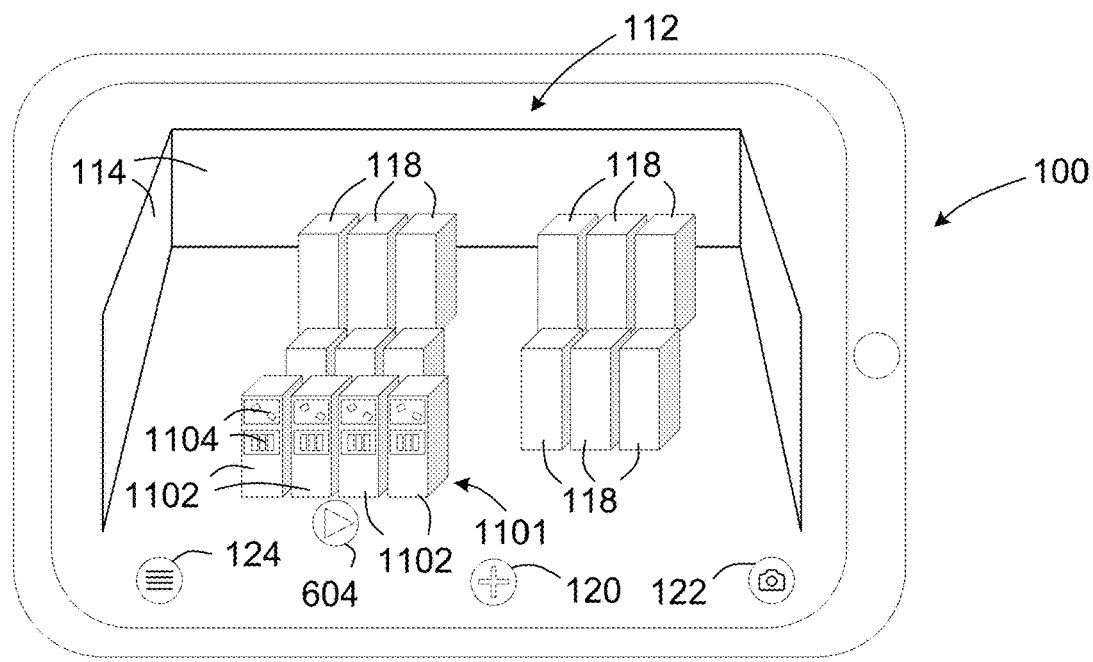
FIG. 11 is a diagrammatic representation of the visualization system shown in FIG. 10 after selection of the location for the EGM bank.

If the selected EGM(s) is/are accepted, a virtual EGM bank 1101 representing the selected EGM(s) is displayed on the gaming area representation 112 at the location and orientation selected by the user, as shown in FIG. 11. Each virtual EGM 1102 of the virtual EGM bank 1101 includes a representation 1104 of the selected game. As with the single virtual EGM bank shown in FIGS. 6 to 8, selection of the play button 606 causes a game or pre-recorded video (or their scaled derivatives) to automatically play on each virtual EGM 1102 of the virtual EGM bank 1101, so that the user is provided with an indication of how the real-world gaming area corresponding to the gaming area representation 112 would look and/or sound if a new bank of four EGMs of specific type and implementing a specific game is added to the real-world gaming area at the selected location.

Figure 12:
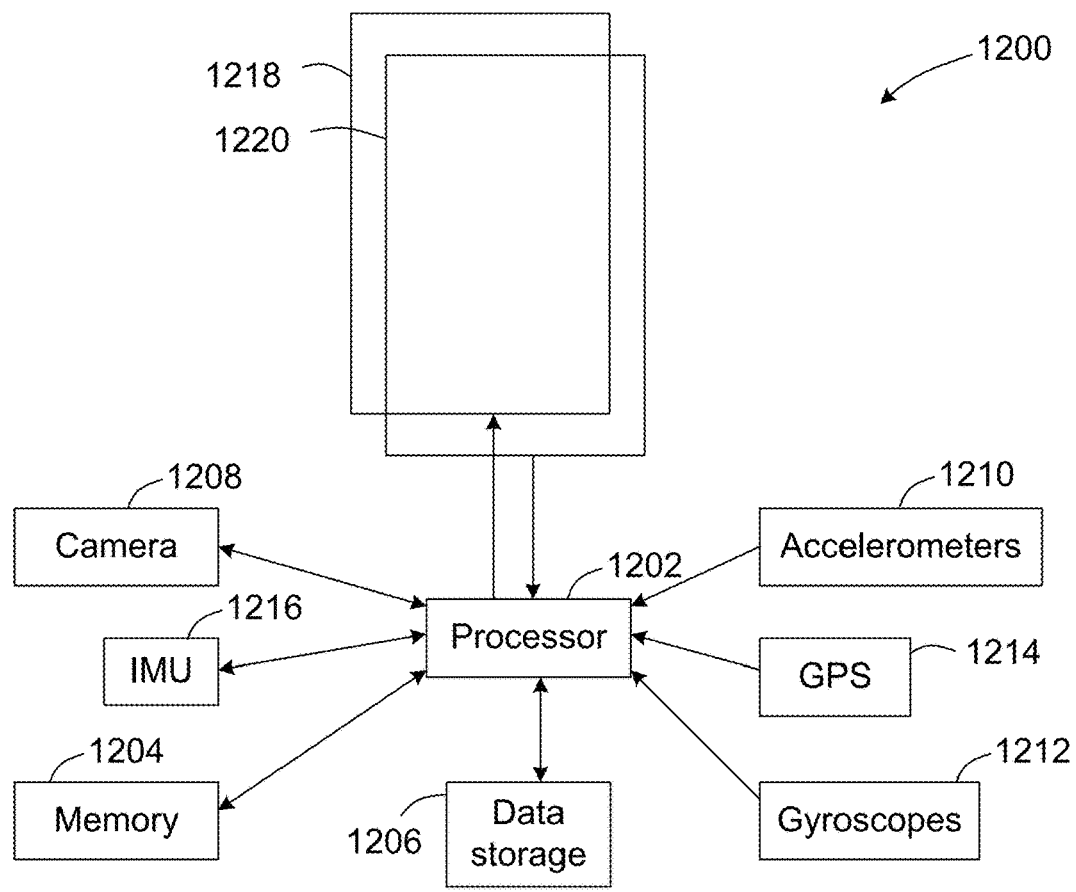
FIG. 12 is a diagrammatic representation of components of a tablet computer used to implement the visualization system according to an embodiment of the present invention.

A block diagram of components 1200 of a tablet computer 100 used to implement the visualization system is shown in FIG. 12. In this example, the visualization system is implemented using the tablet computer 100 as a stand-alone device. However, it will be understood that other implementations are possible. For example, the visualization system may be implemented using a computing device, such as the tablet computer 100, and a remote computing device in networked communication with the tablet computer 100.

As shown, the components 1200 include a processor 1202 arranged to control and coordinate operations in the tablet computer 100, memory 1204 used by the processor 1202 to implement programs (e.g., gaming product application), and data storage 1206 arranged to store data used by the processor 1202, including data indicative of programs to be implemented by the processor 1202, data used by the programs during implementation, data indicative of one or more real-world gaming areas, and data indicative of EGMs, EGM banks and games selectable by a user. As an example, data storage 1206 could communicate with a product catalogue database to obtain new product content, such as game content, virtual EGMs, EGM bank configurations, and/or gaming equipment (e.g., topper or signage) to utilize within the gaming product application The components 1200 also include: (1) at least one camera 1208 usable to capture image data representative of a real-world gaming area for display as a real time view of the real-world gaming area, and feature data indicative of the configuration of the real-world gaming area including data indicative of the floor, walls, and locations of real-world EGMs; (2) at least one accelerometer 1210, in this example separate x, y and z-axis accelerometers, usable to provide data indicative of the direction of movement of the tablet computer; (3) at least one gyroscope 1212, in this example separate gyroscopes for sensing rotational movement of the tablet computer about 3 mutually orthogonal axes; (4) a global positioning system (GPS) 1214 arranged to provide data indicative of the absolute location of the tablet computer; and (5) an inertial measurement unit (IMU) 1216 arranged to use the data from the accelerometers 1210, gyroscopes 1212 and GPS 1214 to provide information about the position and pose of the camera 1208.

The components also include a display 1218 and a touch screen 1220 usable to receive inputs from a user, for example using suitable gestures. The components also include an audio output device, such as a loudspeaker, to produce audio output associated with playing of a game or pre-recorded video.

Figure 13:
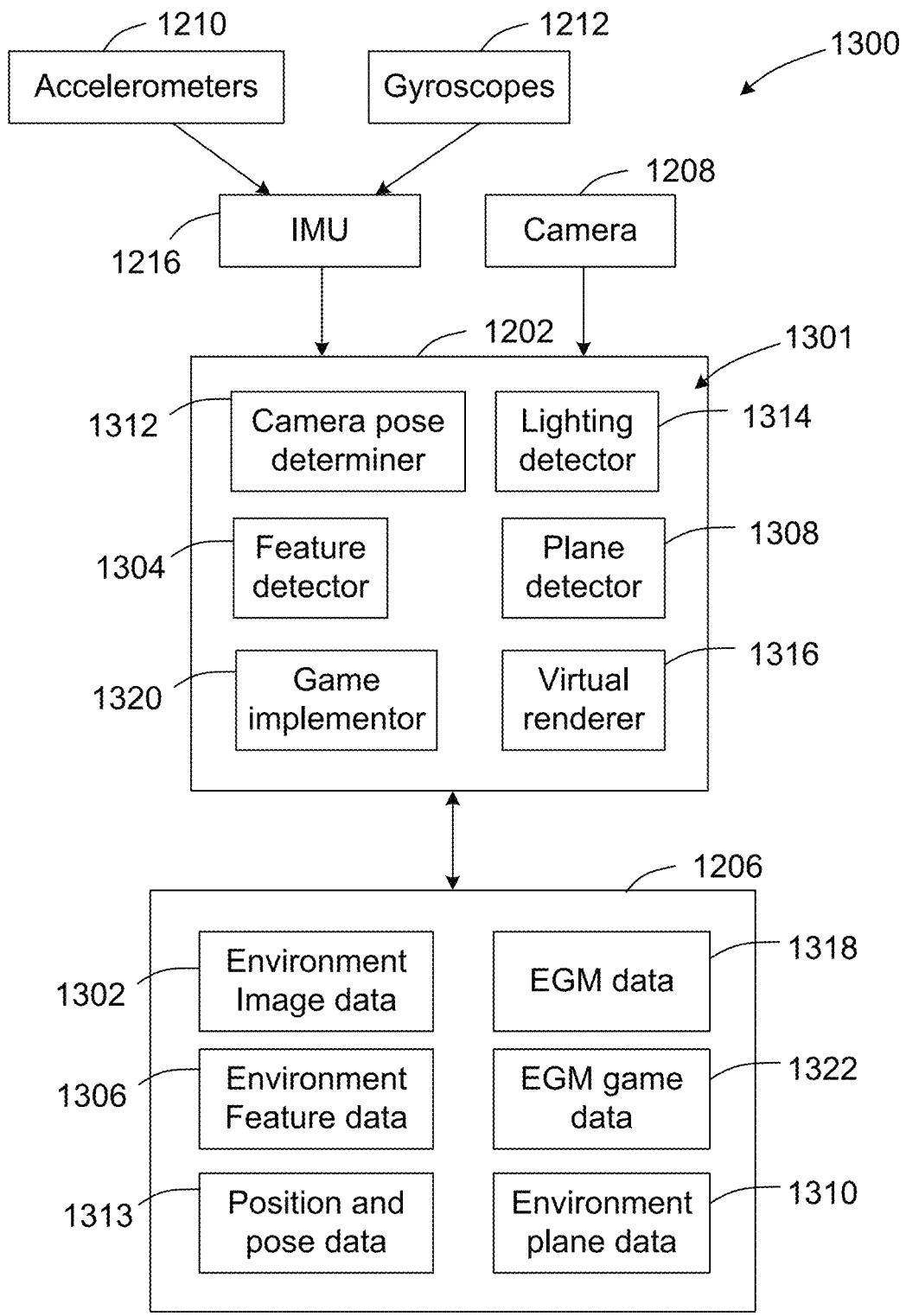
FIG. 13 is a diagrammatic representation of components of the visualization system according to an embodiment of the present invention.

A block diagram of components 1300 of an example implementation of the visualization system is shown in FIG. 13. The visualization system components 1300 include: (1) the accelerometers 1210 and gyroscopes 1212 of the tablet computer 100—that provide translational and rotational movement data usable by the IMU 1216 to obtain location and orientation information of the tablet computer 100; (2) the tablet computer camera 1208; and programs 1301 implemented by the processor 1202 that use or produce data stored in the data storage 1206.

The camera 1208 produces environment image data 1302 indicative of a gaming area when the tablet computer 100 is used to capture a visual representation of the real-world gaming area and/or mixed reality gaming area, and in this example the environment image data 1302 is stored in the data storage 1206. The environment image data 1302 can include data obtained from scanning and/or capturing one or more viewpoints of a physical and/or virtual object. For example, camera 1208 may scan and/or capture multiple images of a real-world EGM or a virtual EGM at different viewing angles, viewing locations, and/or viewing orientations.

The programs 1301 include a feature detector 1304 arranged to obtain feature data indicative of visually distinct features from live images or from the stored environment image data 1302, such as corners of EGMs and intersections between a floor and walls present in the environment image data 1302. The feature data is stored in the data storage 1206 as environment feature data 1306 and is used by a plane detector 1308 to identify flat surfaces such as the floor and walls of the gaming area, and the floor, walls and sides of the EGMs; and intersections between the flat surfaces. The identified flat surfaces are stored in the data storage 1206 as environment plane data 1310.

The programs 1301 also include a camera pose determiner 1312 that uses the location and orientation information produced by the IMU 1216 and the environment feature data 1306 to obtain position and pose data usable to determine the position and pose of the camera 1208 for each view of the gaming area representation 112 on the display of the tablet computer, and stores the position and pose data 1313 in the data storage 1206.

The programs 1301 also include a lighting detector 1314 that uses the captured image data to estimate the lighting characteristics, such as the locations of the light source(s) and intensity of light produced by the light source(s).

It will be understood that the camera pose determiner 1312, the feature detector 1304, the plane detector 1308 and the lighting detector 1314 enable the tablet computer to obtain an understanding of the real-world represented by real-world image data received either as live data or the environment image data 1302 stored in the data storage 1206, and to determine the position and pose of the tablet computer 100 for any camera view. Using this understanding, it is possible to add one or more virtual EGMs into the gaming area representation 112 displayed on the tablet computer 100 with appropriate position and pose and lighting conditions, and in consideration of the plane surfaces in the gaming area representation, so that the virtual content integrates seamlessly with the real-world content. This is achieved by aligning the position and pose of the virtual camera associated with the virtual content to be added with the position and pose information associated with the camera 1208 for the current displayed view of the real-world environment.

Also stored in the data storage 1206 is EGM game data 1322 that defines characteristics of selectable games that may be implemented by a game implementor 1320 and displayed on the virtual EGMs 602, 1102 when the virtual EGMs are added to the display 1218.

The programs 1301 also include a virtual renderer 1316 arranged to render the selected virtual EGM(s) 602, 1102 including the selected game onto the display 1218, the visual characteristics and/or model information of the virtual EGMs being defined in EGM data 1318 and the EGM game data 1322 stored in the data storage 1206.

In this example, the EGM data 1318 and the EGM game data 1322 are stored in respective databases, and an association is defined between the EGM data 1318 and the EGM game data 1322 such that for each EGM type a defined set of EGM games are available for selection. In this way, the EGM types correspond to real-world EGM types that are configured to implement only a defined set of games. During use, an EGM type selected by a user is loaded from the data storage 1206 into cache by the tablet computer 100, and a relevant defined set of games made available for selection.

In one or more implementations, the feature detector 1304 could use the environment image data 1302 to match a physical and/or virtual EGM scanned in a real-world gaming area or mixed reality gaming area to one or more virtual EGMs stored in data storage 1206. Recall that data storage 1206 can periodically download and obtain new content from a product catalogue database, which can also be saved as EGM data 1318. The feature detector 1304 can then map distinct features of the scanned physical and/or virtual EGM to product content information, such as the virtual EGM models stored in EGM data 1318. The feature detector 1304 can use one or more pattern recognition and/or object identification operations known by persons of ordinary skill in the art to determine a matching virtual EGM model. By mapping a scanned physical and/or virtual EGM to a virtual EGM stored in data storage 1206 and/or a product catalogue database, the visualization system is able to edit (e.g., copy) and/or modify the scanned physical and/or virtual EGM.

The virtualization system may be implemented using any suitable augmented reality (AR) tool, including Unity 3D, ARKit and/or ARCore. In such AR-assisted implementations, the processor 1202 is configured to dynamically re-scale and re-orient on the display 1218 any EGM footprint marker (when virtual EGMs are being added) and any added virtual EGM(s). In one or more implementations, programs 1301 can make application programming interface (API) calls to the AR tool to implement the edit and modify functionality described throughout the disclosure.

Figure 14:
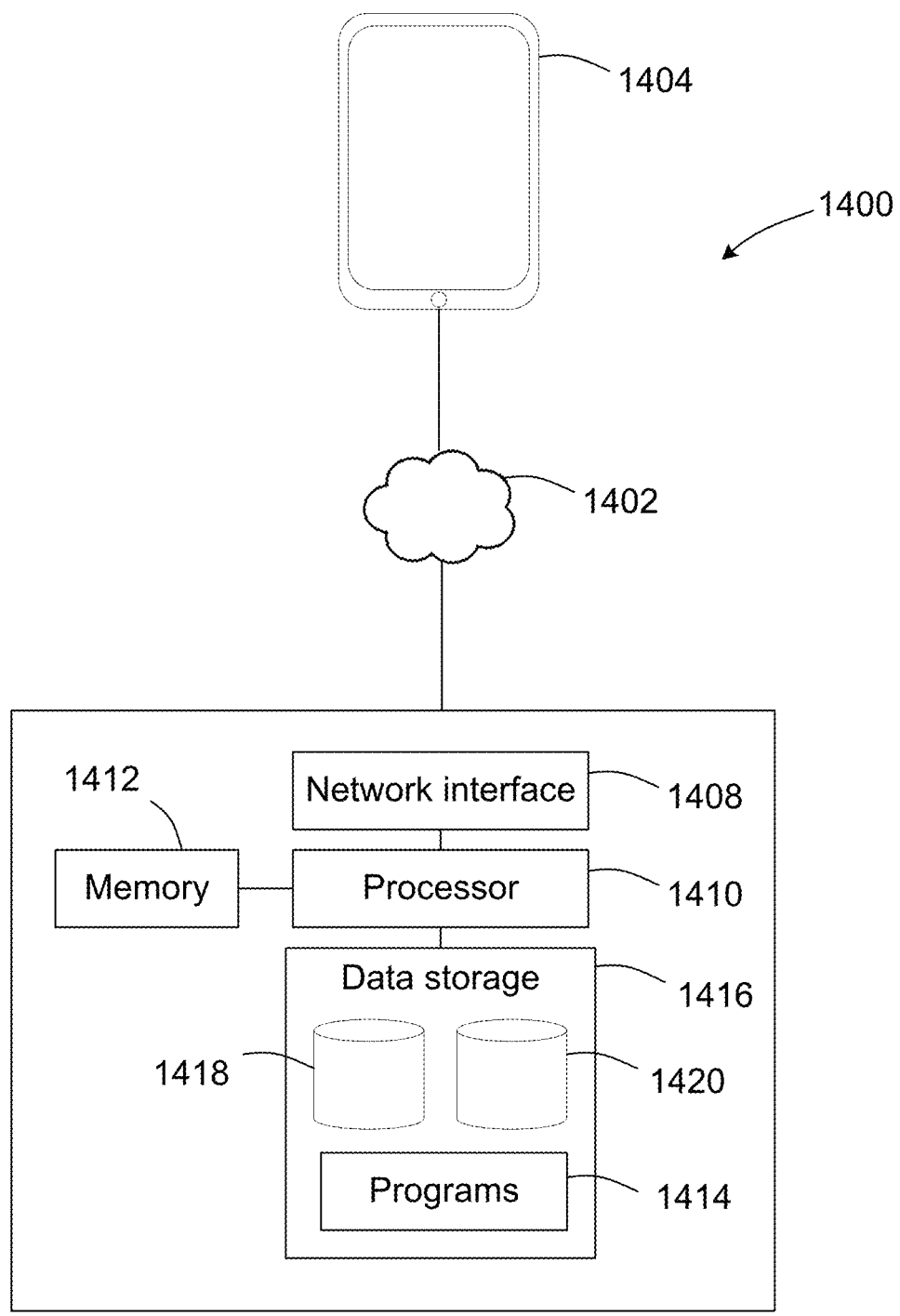
FIG. 14 is a diagrammatic representation of components of a visualization system according to an alternative embodiment of the present invention.

An alternative visualization system 1400 is shown in FIG. 14. The functionality of the visualization system 1400 is similar to the functionality of the visualization system shown in FIGS. 1 to 13 except that components of the visualization system are distributed across a communication network, in this example represented by the Internet 1402.

The visualization system 1400 includes a computing device, in this example a tablet computer 1404, although it will be understood that other computing devices are envisaged, such as a smartphone or a laptop computer. The tablet computer 1404 is in networked communication with a remote computing device 1406 that in this example is implemented using a computer server. The remote computing device 1406 includes a network interface 1408 that facilitates network communications to and from the remote computing device 1406, a processor 1410 and associated memory 1412 arranged to implement functionality using programs 1414 stored in a data storage device 1416, and at least one database arranged to store the EGM data 1418 and the EGM game data 1420.

It will be understood that the data storage device 1416 may also store other data used, received and/or and created by the visualization system, including the environment image data 1302, environment feature data 1306, position and pose data 1313 and environment plane data 1310 referred to in relation to FIG. 13, or some of the data may be stored at the tablet computer 1404 and some of the data may be stored at the remote computing device 1406. In one or more implementations, data storage device 1416 could act as a product catalogue database that periodically updates and/or publishes new product content to tablet computer 1404 to present using the gaming product application.

It will also be understood that one or more of the programs referred to in relation to FIG. 13, including the camera pose determiner 1312, the lighting detector 1314, the feature detector 1304, the plane detector 1308, the game implementor 1320 and the virtual renderer 1316 may be implemented at the remote computing device 1406 instead of at the tablet computer 1404.

Figure 15:
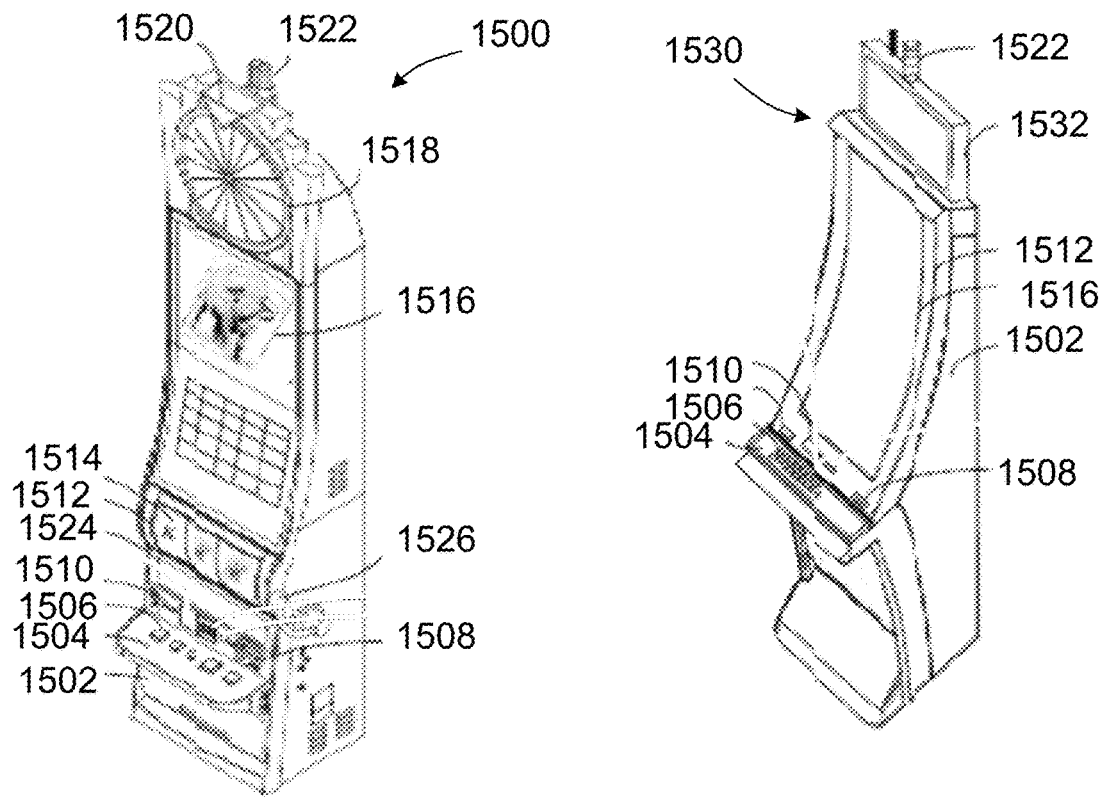
FIG. 15 is an exemplary diagram showing several example EGM types that are available for selection.
Figure 15:
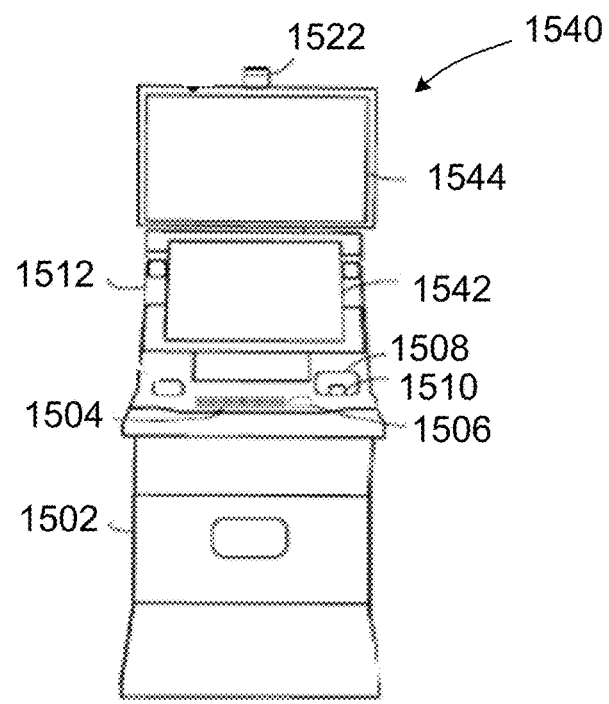

FIG. 15 illustrates several different example real-world models of EGM that may be represented by the stored EGM data 1318 and virtually added to the gaming area representation 112.

Gaming device 1500 is often of a cabinet construction which may be aligned in rows or banks of similar devices for placement and operation on a casino floor. The gaming device 1500 often includes a main door that provides access to the interior of the cabinet. Gaming device 1500 typically includes a button area or button deck 1504 accessible by a player that is configured with input switches or buttons 1506, an access channel for a bill validator 1508, and/or an access channel for a ticket-out printer 1510.

The gaming device 1500 is shown as a Relm XL™ model gaming device manufactured by Aristocrat® Technologies, Inc. As shown, gaming device 1500 is a reel machine having a gaming display area 1512 comprising a number (typically 3 or 5) of reels 1514 with various symbols displayed on them. The reels 1514 are independently spun and stopped to show a set of symbols within the gaming display area 1512 which may be used to determine an outcome to the game.

In many configurations, the gaming device 1500 may have a main display 1516 mounted to, or above, the gaming display area 1512. The main display 1516 may be flat or curved.

In some embodiments, the bill validator 1508 may correspond to a "ticket-in" reader that allows the player to use a casino issued credit ticket to load credits onto the gaming device 1500 (e.g., in a cashless ticket-in-ticket-out (TITO) system). Cashless TITO systems are well known in the art and are used to generate and track unique bar-codes or other indicators printed on tickets to allow players to avoid the use of bills and coins by loading credits using a ticket reader and cashing out credits using a ticket-out printer 1510 on the gaming device 1500.

Gaming device 1500 may also include a bonus topper wheel 1518. When bonus play is triggered (e.g., by a player achieving a particular outcome or set of outcomes in the primary game), bonus topper wheel 1518 is operative to spin and stop with indicator arrow 1520 indicating the outcome of the bonus game. Bonus topper wheel 1518 is typically used to play a bonus game, but it could also be incorporated into play of the base or primary game.

A candle 1522 may be mounted on the top of gaming device 1500 and may be activated by a player (e.g., using a switch or one of buttons 1506) to indicate to operations staff that gaming device 1500 has experienced a malfunction or the player requires service. The candle 1522 is also often used to indicate a jackpot has been won and to alert staff that a hand payout of an award may be needed.

There may also be one or more information panels 1524 which may be a back-lit, silkscreened glass panel with lettering to indicate general game information including, for example, a game denomination (e.g., $0.25 or $1), pay lines, pay tables, and/or various game related graphics. In some embodiments, the information panel(s) 1524 may be implemented as an additional video display.

Gaming devices 1500 have traditionally also included a handle 1526 typically mounted to the side of main cabinet 1502 which may be used to initiate game play.

Note that not all gaming devices necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards.

An alternative example gaming device 1530 is the Arc™ model gaming device manufactured by Aristocrat® Technologies, Inc. Note that where possible, reference numerals identifying similar features of the gaming device 1500 embodiment are also identified in the gaming device 1530 embodiment using the same reference numbers. Gaming device 1530 does not include physical reels and instead shows game play functions on main display 1516. An optional topper screen 1532 may be used as a secondary game display for bonus play, to show game features or attraction activities while a game is not in play, or any other information or media desired by the game designer or operator. In some embodiments, topper screen 1532 may also or alternatively be used to display progressive jackpot prizes available to a player during play of gaming device 1530.

Example gaming device 1530 includes a main cabinet 1502 including a main door which opens to provide access to the interior of the gaming device 1530. The main or service door is typically used by service personnel to refill the ticket-out printer 1510 and collect bills and tickets inserted into the bill validator 1508. The door may also be accessed to reset the machine, verify and/or upgrade the software, and for general maintenance operations.

Another example gaming device 1540 shown is the Helix™ model gaming device manufactured by Aristocrat® Technologies, Inc. Gaming device 1540 includes a main display 1542 that is in a landscape orientation. Although not illustrated by the front view provided, the landscape main display 1542 may have a curvature radius from top to bottom, or alternatively from side to side. In some embodiments, main display 1542 is a flat panel display. Main display 1542 is typically used for primary game play while secondary display 1544 is typically used for bonus game play, to show game features or attraction activities while the game is not in play or any other information or media desired by the game designer or operator.

Many different types of games, including mechanical slot games, video slot games, video poker, video blackjack, video pachinko, keno, bingo, and lottery, may be implemented by the depicted gaming devices 1500, 1530, 1540 and other similar gaming devices. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

Figure 16:
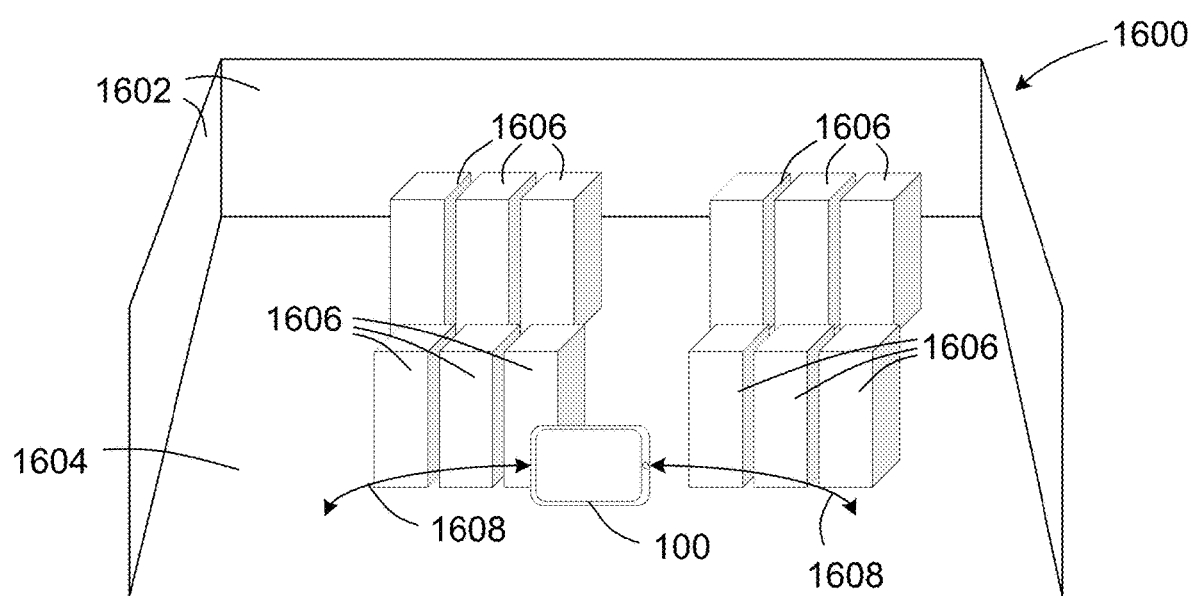
FIG. 16 is a diagrammatic representation of a gaming area that includes several EGMs and showing use of a tablet computer to capture environment feature data associated with a visual representation of the gaming area.

Referring to FIG. 16, a real-world gaming area 1600 having walls 1602 and a floor 1604 is shown, the real-world gaming area 1600 including multiple real-world EGMs 1606.

Figure 17:
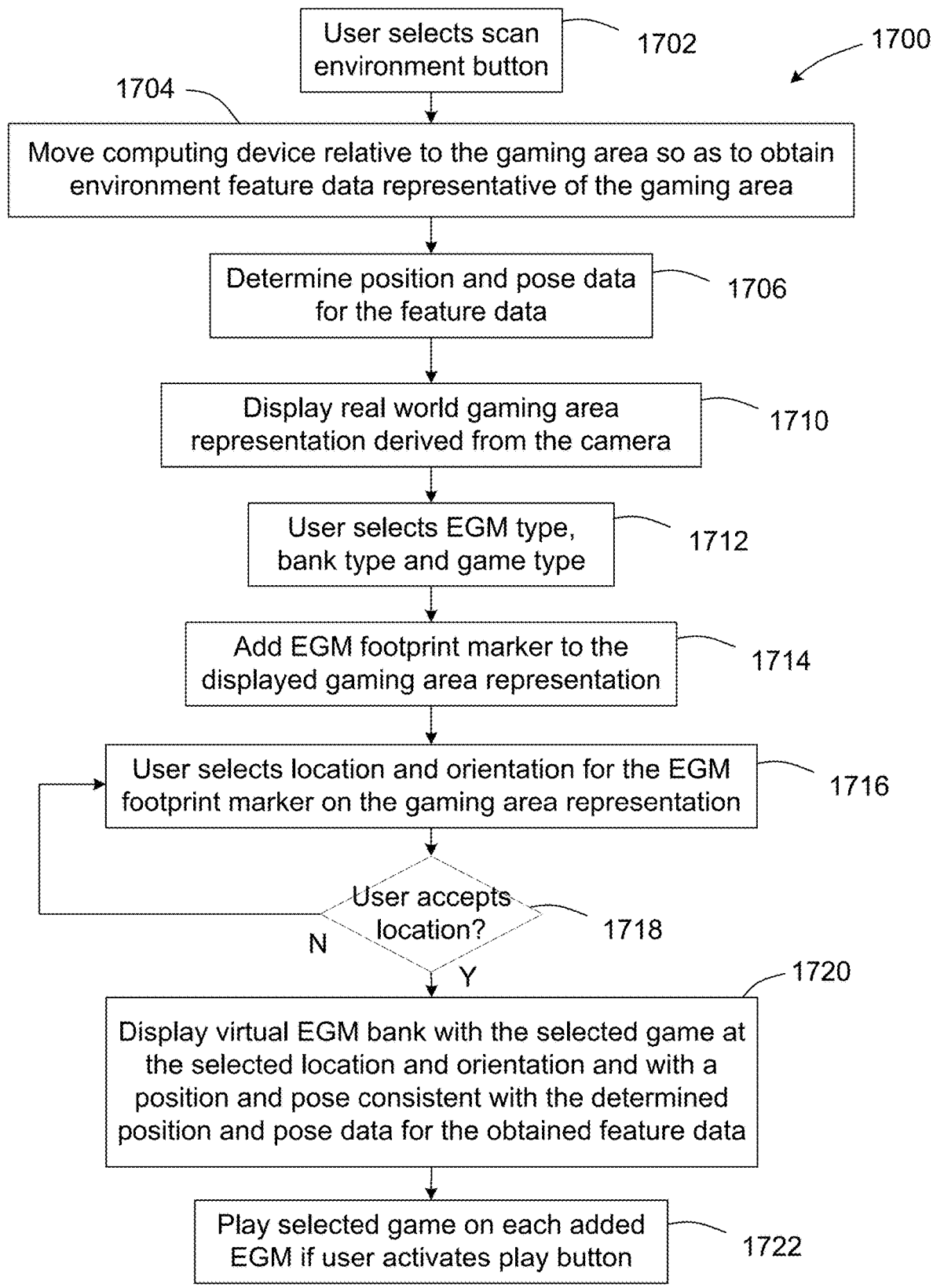
FIG. 17 is a flow diagram illustrating a visualization method according to an embodiment of the present invention.

An example visualization method during use is represented by flow diagram 1700 in FIG. 17.

During use, in order to produce environment feature data 1306 representative of the configuration of the real-world gaming area 1600, a user first selects a scan environment button, as indicated at step 1702, for example that becomes available by selecting a menu button 124, as shown in FIGS. 1 to 7. The user then moves the tablet computer 100 relative to the real-world gaming area 1600, as indicated by arrows 1608 and step 1704, paying particular attention to the floor and intersections between the floor, walls and EGMs, so that necessary feature information associated with the real-world gaming area 1600 is obtained. Using the stored environment feature data 1306, the camera pose determiner 1312, the feature detector 1304, the plane detector 1308 and the lighting detector 1314, the visualization system then obtains an understanding of the real-world represented by the environment feature data 1306 that can be used to determine the position and pose of the tablet computer 100 for any selected view of the environment image data 1302, as indicated at step 1706.

In addition to carrying out a scan of the real-world gaming area 1600 to produce environment feature data, the scan environment function may also capture image information so that a visual representation of the real-world can be produced. Such a visual representation may be stored as the environment image data 1302 and for example shared with other users for use in an online implementation and/or for collaboration purposes, for example so that a proposed new layout for a gaming area can be created and electronically communicated to a customer for review. In one or more implementations, the scan environment button can also be used to scan certain real-world EGMs to be matched with a virtual EGM that has been indexed or catalogued.

The user is then able to view a real time image of the real-world gaming area 1600 on the display of the tablet computer 100, as indicated at step 1710. Using the EGM type selection box 202, the EGM bank type selection box 302 and the game selection box 402, the user is able to select the EGM type to be added to the displayed gaming area representation 112, as shown in FIG. 2, and to select the bank type and game type to be displayed on the added EGM(s), as shown in FIGS. 3 and 4, as indicated at step 1712. After selection of the EGM type, bank type and game type, an EGM footprint marker 502 representative of the footprint of the selected EGMs is displayed, as indicated at step 1714. The user is able to move and rotate the EGM footprint marker 502 using suitable touch gestures in order to position the virtual EGMs at the desired location relative to the gaming area representation 112, as indicated at step 1716. Selection of the accept button 506, as indicated at step 1718, causes the virtual EGMs to be displayed on the gaming area representation 112 at the location and orientation selected by the user and with a position and pose associated with the feature data, as indicated at step 1720 and shown in FIG. 6, and with each virtual EGM 602 of the virtual EGM bank including a representation 604 of the selected game.

The virtual EGM bank is rendered on the display by the virtual renderer 1316 using the position and pose data 1313 associated with the current view so that the position and virtual camera associated with the added EGM is aligned with the position and pose of the camera associated with the current displayed gaming area representation.

Using the play button adjacent the virtual EGM bank, the user is able to cause a game to play on each virtual EGM, as indicated at step 1722, so that the user is provided with a representation of how the real-world gaming area represented by the gaming area representation 112 would look if a new bank of one or more EGMs implementing the selected game is added.

The user is able to change the position and pose of the virtual camera and to zoom into or out of any portion of the gaming area representation 112 shown on the tablet computer 100, for example using typical touch gestures.

It will be understood that instead of displaying pre-recorded video on the virtual EGMs 602 when the user activates the play button 606, the system may be arranged to execute an actual game that requires input from the user in a comparable way to a real-world EGM, so that the user is provided with a more realistic interactive experience that replicates the experience in the real-world. In this example, the tablet computer 100 may include communication means (e.g. fixed or wireless communication connections) configured to communicate with a remote game server via a communications network (e.g. a secure network, such as a virtual private network) to send and receive gaming data enabling the interactive game. With such an arrangement, since the user can play an actual game, the user may obtain rewards and prizes in a comparable way to a physical or online EGM arrangement. To facilitate receipt of rewards, the system may be arranged to record and manage user accounts that may require the user to carry out a login and authentication process.

Figure 18:
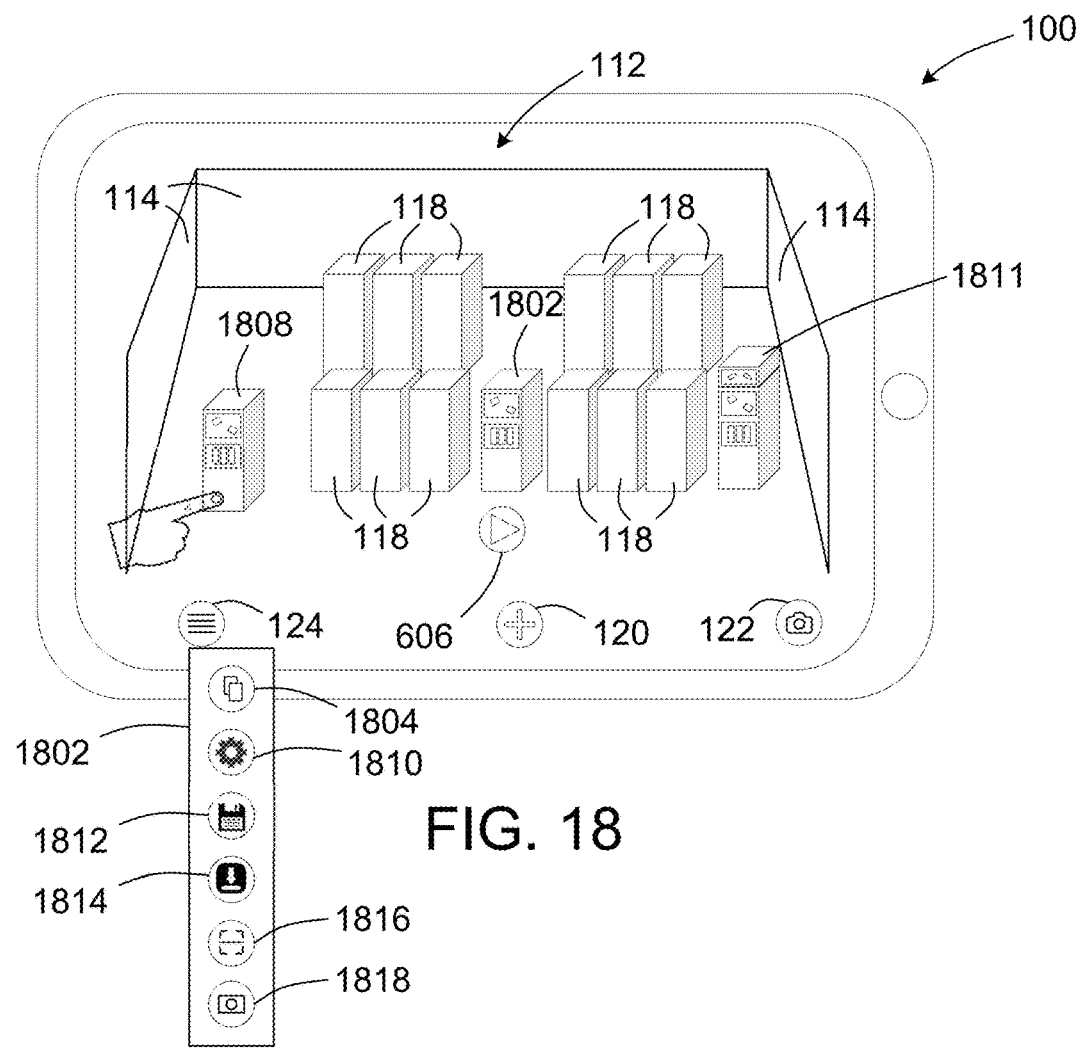
FIG. 18 is a diagrammatic representation of the tablet computer during use and illustrating functionality available to a user when a menu button is selected.

FIG. 18 shows additional functionality available to a user when the menu button 124 is selected. As shown, activation of the menu button 124 causes a drop-down box 1802 to appear that provides several user selectable buttons that correspond to edit and/or modification functionality. The user selectable buttons include a copy button 1804 that when selected enables a user to copy a virtual EGM or bank of virtual EGMs that have already been added to the gaming area representation 112, the EGM copy including the same EGM type and game characteristics as the original virtual EGM. For example, as shown in FIG. 18, an added virtual EGM 1806 may be copied by the user, for example by selecting the virtual EGM 1806, selecting the copy button 1804, then selecting a location on the gaming area representation 112 for the new EGM 1808. In another example, the selecting the copy button 1804 copies real-world and/or virtual EGMs that have been scanned and matched to a catalogued virtual EGM. It will be understood that this feature significantly reduces the time required to add a virtual EGM to the gaming area representation 112 since the steps of selecting EGM type, EGM bank type, and game are avoided.

The user selectable functions also include a configuration button 1810 usable for example to change the appearance and/or configuration of any of the added virtual EGMs. For example, the user may be provided with selectable virtual parts that may be added, including a top box, an edge lighting module, replacement decals or a replacement button arrangement. A virtual part may also be added to the gaming area representation 112 at a location on the gaming area representation 112 such that the virtual part appears to be part of a real-world EGM. In the present example shown in FIG. 18, a top box 1811 has been added to a virtual EGM. In this example, data indicative of the virtual parts may be stored locally or remotely, for example in EGM data 1318. In another example, the top box 1811 can be added to a scanned physical EGM.

The configuration button 1810 may also be used to virtually modify the displayed representation of the real-world gaming area, for example, so as to change the appearance of the floor, walls or lighting in the displayed gaming area. In one or more implementations, the configuration button 1810 could modify the appearance of a scanned real-world EGM. Such functionality may be enabled by providing the visualization system with feature recognition capability arranged to recognize the floor and wall areas of the gaming area, and EGMs, for example, using machine learning techniques known by persons of ordinary skill in the art.

The user selectable functions also include a save layout button 1812 that when selected causes data indicative of the locations of the added virtual EGMs to be stored at the tablet computer 100 and/or at the remote computing device. The stored virtual EGM layout may be retrieved using a load button 1814.

The user selectable buttons also include a scan features button 1816 usable to capture the environment feature data 1306 as described above in relation to FIGS. 16 and 17.

The user selectable buttons also include a scan area button 1818 usable to capture a gaming area representation 112 of a real-world gaming area, for example, so that the captured gaming area representation 112 can be stored locally or remotely and used instead of a live representation derived from the computing device camera. It will be understood that an implementation using such a stored representation may not be in augmented reality implementation, and instead may, for example, be used to provide a pseudo virtual 3D representation of the real-world gaming area that a user is able to navigate thorough using a computing device and suitable controls, such as a mouse, or using a computing device and associated virtual reality (VR) headset.

Figure 19:
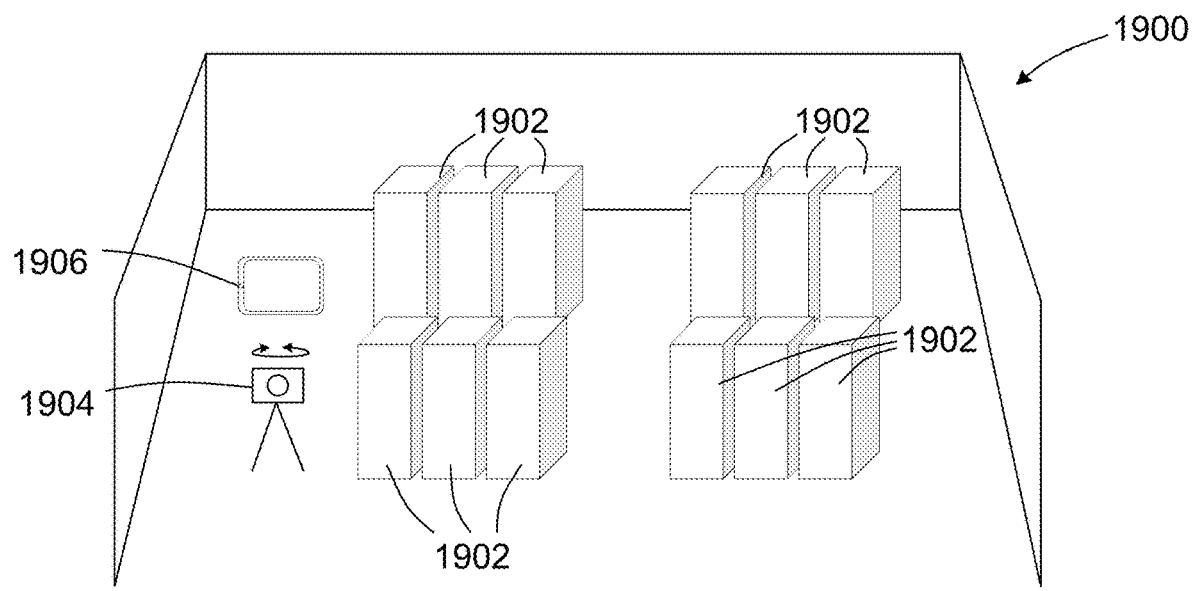
FIG. 19 is a diagrammatic representation of a gaming area that includes several EGMs and showing use of a tablet computer and rotatable camera to capture an image representation of the gaming area.

An example image capture arrangement for capturing an image representation of a real-world gaming area 1900 is illustrated in FIG. 19. The real-world gaming area 1900 includes multiple real-world EGMs 1902, and in this example the image representation is captured using a rotatable camera 1904 and a portable computing device, such as a tablet computer 1906. In this implementation, the tablet computer 1906 is used to control the rotatable camera 1904 to capture 360° images at different locations on the gaming area, and to combine and/or stitch together the captured images so that a pseudo 3D representation of the gaming area is produced.

The captured image representation of the real-world gaming area 1900 may be stored locally at the tablet computer 100 and/or stored remotely at the remote computing device 1406, loaded into a suitable computing device for display, and one or more virtual EGMs added to the image representation to provide the user with an indication as to how the real-world gaming area represented by the image representation will appear if at least one additional EGMs is added to the real-world gaming area represented by the image representation. In this way, a user is able to produce a virtual representation of a proposed gaming area layout without being present at a real-world gaming area 1900.

In one or more implementations, the scan area button 1818 captures image information so that a visual representation of the real-world can be produced in AR. Such a visual representation may be stored as the environment image data 1302 and for example shared with other users for use in an online implementation and/or for collaboration purposes, for example, so that a proposed new layout for a gaming area can be created and electronically communicated to a customer for review.

The scan area button 1818 can also be used to scan certain real-world EGMs to be matched with a catalogued virtual EGM. For example, activating scan area button 1818 may perform multiple scan operations that captures multiple images of a real-world EGM or a virtual EGM at different viewing angles, viewing locations, and/or viewing orientations. Based on the scan operations, the tablet computer 100 can cross reference and match the captured real-world EGM or virtual EGM to one or more catalogued EGMs.

Figure 20:
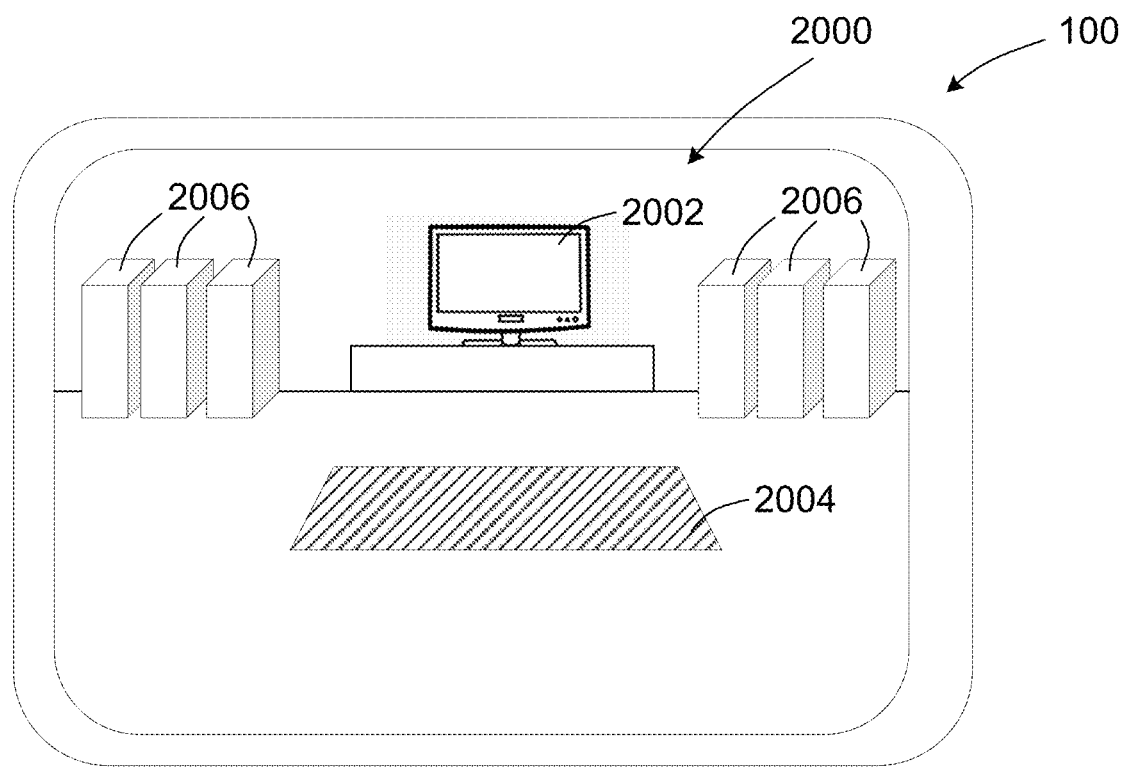
FIG. 20 is a diagrammatic representation of an alternative visualization system using a tablet computer according to an embodiment of the present invention.

A further example visualization system use is shown in FIG. 20. In this example, instead of a real-world gaming area at a casino, the real-world gaming area is a room associated with a user, such as for example a room 2000 at the user's house. In the example shown, the room 2000 is a user's living room that includes a real-world TV 2002 and a real-world rug 2004. With this example, instead of using the virtualization system to provide an indication as to how a real-world gaming area will look if additional EGMs implementing specific games are added, the visualization system is used to produce a virtual gaming room that is customizable by a user, and for example integrates in an augmented reality way with the user's room 2000. As discussed above, virtual EGMs 2006, virtual EGM banks may be added by a user and specific games selected to be implemented on the virtual EGMs.

With the present example, the games implemented on the virtual EGMs are playable in that the game implementations correspond to actual game implementations wherein the user is able to receive awards and prizes. In this way, the user is provided with a user-defined set of EGMs that appear to be present in the user's room 2000 and that are playable. By interacting with the virtual gaming room using a VR headset, the user is provided with a customizable virtual gaming room that provides a similar experience to an actual gaming room.

In accordance with a first aspect of the present invention, there is provided a visualization system comprising: a display arranged to display a representation of a real-world gaming area configured to accommodate at least one electronic gaming machine; at least one data storage device; EGM data indicative of the appearance of at least one real-world electronic gaming machine, the EGM data stored in the at least one data storage device; and game data indicative of at least one game, the game data stored in the at least one data storage device; and wherein the system is arranged to: in response to user input, add at least one virtual electronic gaming machine to the representation of the real-world gaming area, each virtual electronic gaming machine corresponding to stored EGM data representative of a real-world gaming machine, and each virtual electronic gaming machine implementing a game corresponding to stored game data; and facilitate selection by the user of the location and orientation of the added at least one virtual electronic gaming machine; wherein the displayed representation of the real-world gaming area and the displayed at least one virtual electronic gaming machine provide the user with an indication as to how the real-world gaming area will appear if at least one electronic gaming machine corresponding to the at least one virtual electronic gaming machine and implementing the game is added to the real-world gaming area.

In an embodiment, the system is arranged to store data indicative of the appearance of a plurality of electronic gaming machine types, and to facilitate selection by a user of an electronic gaming machine type from the plurality of electronic gaming machine types for addition as a virtual electronic gaming machine.

In an embodiment, each type of electronic gaming machine has an associated set of games that are available for selection, each available game corresponding to a game that is implementable on a real-world electronic gaming machine type corresponding to the virtual electronic gaming machine type.

In an embodiment, the system is arranged to: display a footprint marker representative of the selected at least one electronic gaming machine; facilitate selection by the user of the location and orientation of the footprint marker; and add the at least one virtual electronic gaming machine to the representation of the real-world gaming area after receiving confirmation from the user of the location and orientation of the footprint marker.

In an embodiment, the shape and size of the footprint marker is representative of the shape and size of a footprint area taken up by the selected at least one electronic gaming machine.

In an embodiment, the system is arranged to store data indicative of a plurality of types of banks of electronic gaming machines, and to facilitate selection by a user of an electronic gaming machine bank from the plurality of electronic gaming machine banks for addition as a virtual bank of electronic gaming machines.

In an embodiment, the system is arranged to store data indicative of a plurality of games implementable on an electronic gaming machine, and to facilitate selection by a user of a game from the plurality of games for display and virtual implementation on the at least one added virtual electronic gaming machine.

In an embodiment, a virtual electronic gaming machine is addable to a virtual electronic gaming machine to the representation of the real-world gaming area by selecting and copying a displayed virtual electronic gaming machine.

In an embodiment, the footprint marker includes an associated banner, the banner including information indicative of the at least one selected electronic gaming machine, the selected electronic gaming machine bank and the game.

In an embodiment, the system is arranged to enable a user to control commencement of play of the game on the at least one virtual electronic gaming machine.

In an embodiment, the system is arranged to commence play of the game on the at least one virtual electronic gaming machine automatically based on defined criteria.

In an embodiment, the system is arranged to commence play of the game on the at least one virtual electronic gaming machine based on zoom level.

In an embodiment, the game implemented on the at least one virtual electronic gaming machine is automatic, wherein the game is implemented without interaction with the user.

In an embodiment, the game implemented on the at least one virtual electronic gaming machine is not automatic, wherein implementation of the game requires interaction with the user.

In an embodiment, the system is arranged to determine whether an outcome of the game implemented on the at least one virtual electronic gaming machine corresponds to a winning outcome and to award a prize if a winning outcome occurs.

In an embodiment, the system is arranged to facilitate selective display by the user of a portion of the representation of the real-world gaming area, for example by facilitating zoom control by the user of the representation of the real-world gaming area.

In an embodiment, the visualization system comprises a camera usable to capture the representation of the real-world gaming area, and a data storage device arranged to store real-world gaming area data indicative of the captured representation of the real-world gaming area.

In an embodiment, the representation captured by the camera and displayed on the display is a live representation of the real-world gaming area.

In an embodiment, the representation captured by the camera and displayed on the display is derived from a stored representation of the real-world gaming area.

In an embodiment, the visualization system is arranged to enable a user to store and retrieve layout data indicative of the at least one virtual electronic gaming machine added to the representation of the real-world gaming area, the locations and orientations of the added at least one virtual electronic gaming machine, and the respective game implemented on each of the at least one virtual electronic gaming machine.

In an embodiment, the layout data is shareable electronically.

In an embodiment, the system comprises a game controller that includes at least one processor and at least one memory device, the at least one processor, the at least one memory device, and the at least one display being operably connected; wherein the at least one data storage device comprises a remote data storage device in networked communication with the game controller.

In an embodiment, the at least one data storage device comprises at least one EGM database arranged to store the EGM data and at least one game database arranged to store the game data.

In an embodiment, the system comprises virtual part data indicative of at least one virtual part, each virtual part being selectable for addition to a virtual electronic gaming machine.

In an embodiment, the at least one virtual part includes a top box, an edge lighting module, replacement decals and/or a replacement button arrangement.

In accordance with a second aspect of the present invention, there is provided a visualization system comprising: at least one display; a game controller that includes at least one processor and at least one memory device, wherein: the at least one processor, the at least one memory device, and the at least one display are operably connected; and the at least one memory device stores computer-readable instructions for controlling the at least one processor to: display a representation of a real-world gaming area configured to accommodate at least one electronic gaming machine; store EGM data indicative of the appearance of at least one real-world electronic gaming machine in at least one data storage device; store game data indicative of at least one game in the at least one data storage device; in response to user input, add at least one virtual electronic gaming machine to the representation of the real-world gaming area, each virtual electronic gaming machine corresponding to stored EGM data representative of a real-world gaming machine, and each virtual electronic gaming machine implementing a game corresponding to stored game data; and facilitate selection by the user of the location and orientation of the added at least one virtual electronic gaming machine; wherein the displayed representation of the real-world gaming area and the displayed at least one virtual electronic gaming machine provide the user with an indication as to how the real-world gaming area will appear if at least one electronic gaming machine corresponding to the at least one virtual electronic gaming machine and implementing the game is added to the real-world gaming area.

In accordance with a third aspect of the present invention, there is provided a visualization method comprising: displaying a representation of a real-world gaming area configured to accommodate at least one electronic gaming machine; storing EGM data indicative of the appearance of at least one real-world electronic gaming machine in at least one data storage device; storing game data indicative of at least one game in the at least one data storage device; in response to user input, adding at least one virtual electronic gaming machine to the representation of the real-world gaming area, each virtual electronic gaming machine corresponding to stored EGM data representative of a real-world gaming machine, and each virtual electronic gaming machine implementing a game corresponding to stored game data; and facilitating selection by the user of the location and orientation of the added at least one virtual electronic gaming machine; wherein the displayed representation of the real-world gaming area and the displayed at least one virtual electronic gaming machine provide the user with an indication as to how the real-world gaming area will appear if at least one electronic gaming machine corresponding to the at least one virtual electronic gaming machine and implementing the game is added to the real-world gaming area.

While the invention has been described with respect to the accompanying figures, it will be appreciated that many modifications and changes may be made by those skilled in the art without departing from the spirit of the invention. Any variation and derivation from the above description and Figures are included in the scope of the present invention as defined by the claims.

The present disclosure is widely applicable to numerous embodiments, as is readily apparent from the disclosure. One of ordinary skill in the art will recognize that the innovations described herein may be practiced with various modifications and alterations, such as structural, logical, software, and electrical modifications. Although particular features of the innovations described herein may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the innovations described herein that must be present in all embodiments.

The Title (set forth at the beginning of the first page of this disclosure) is not to be taken as limiting in any way as the scope of the disclosed embodiments. Headings of sections provided in this disclosure are for convenience only and are not to be taken as limiting the disclosure in any way.

When an ordinal number (such as "first," "second," "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget." Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When introducing elements of aspects of the present disclosure or embodiments thereof, the articles "a," "an," "the," and "said" are intended to mean that there are one or more of the elements. The terms "comprising," including," and "having" are intended to be inclusive and mean that there may be additional elements other than the listed elements.

When a single device, component, structure, or article is described herein, more than one device, component, structure or article (whether or not they cooperate) may alternatively be used in place of the single device, component or article that is described. Accordingly, the functionality that is described as being possessed by a device may alternatively be possessed by more than one device, component or article (whether or not they cooperate).

Similarly, where more than one device, component, structure, or article is described herein (whether or not they cooperate), a single device, component, structure, or article may alternatively be used in place of the more than one device, component, structure, or article that is described. For example, a plurality of computer-based devices may be substituted with a single computer-based device. Accordingly, the various functionality that is described as being possessed by more than one device, component, structure, or article may alternatively be possessed by a single device, component, structure, or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Further, the systems and methods described herein are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

Devices that are in communication with each other need not be in continuous communication with each other, unless expressly specified otherwise. On the contrary, such devices need only transmit to each other as necessary or desirable and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the innovations described herein. Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the innovations described herein, and does not imply that the illustrated process is preferred.

Although a process may be described as including a plurality of steps, that does not indicate that all or even any of the steps are essential or required. Various other embodiments within the scope of the present disclosure include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the present disclosure include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise.

For the sake of presentation, the detailed description uses terms like "determine" and "select" to describe computer operations in a computer system. These terms denote operations performed by a computer and should not be confused with acts performed by a human being. The actual computer operations corresponding to these terms vary depending on implementation. For example, "determining" something can be performed in a variety of manners, and therefore the term "determining" (and like terms) can indicate calculating, computing, deriving, looking up (e.g., in a table, database or data structure), ascertaining, recognizing, and the like.

As used herein, the term "send" denotes any way of conveying information from one component to another component, and the term "receive" denotes any way of getting information at one component from another component. The two components can be part of the same computer system or different computer systems. The information can be passed by value (e.g., as a parameter of a message or function call) or passed by reference (e.g., in a buffer). Depending on context, the information can be communicated directly between the two components or be conveyed through one or more intermediate components. As used herein, the term "connected" denotes an operable communication link between two components, which can be part of the same computer system or different computer systems. The operable communication link can be a wired or wireless network connection, which can be direct or pass through one or more intermediate components (e.g., of a network). Communication among computers and devices may be encrypted to ensure privacy and prevent fraud in any of a variety of ways well known in the art.

It will be readily apparent that the various methods and algorithms described herein may be implemented by, e.g., appropriately programmed general-purpose computers and computing devices. Typically, a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium for performing the process. The apparatus that performs the process can include components and devices (e.g., a processor, input and output devices) appropriate to perform the process. A computer-readable medium can store program elements appropriate to perform the method.

The term "computer-readable medium" refers to any non-transitory storage or memory that may store computer-executable instructions or other data in a computer system and be read by a processor in the computer system. A computer-readable medium may take many forms, including but not limited to non-volatile storage or memory (such as optical or magnetic disk media, a solid-state drive, a flash drive, programmable read-only memory (PROM), erasable programmable read-only memory (EPROM), and other persistent memory) and volatile memory (such as dynamic random access memory (DRAM)). The term "computer-readable media" excludes signals, waves, and wave forms or other intangible or transitory media that may nevertheless be readable by a computer.

The present disclosure provides, to one of ordinary skill in the art, an enabling description of several embodiments and/or innovations. Some of these embodiments and/or innovations may not be claimed in the present application but may nevertheless be claimed in one or more continuing applications that claim the benefit of priority of the present application. Applicants may file additional applications to pursue patents for subject matter that has been disclosed and enabled but not claimed in the present application.

The foregoing description discloses only exemplary embodiments of the present disclosure. Modifications of the above disclosed apparatus and methods which fall within the scope of the present disclosure will be readily apparent to those of ordinary skill in the art. For example, although the examples discussed above are illustrated for a gaming market, embodiments of the present disclosure can be implemented for other markets. The gaming system environment of the examples is not intended to suggest any limitation as to the scope of use or functionality of any aspect of the disclosure.

While the invention has been described with respect to the figures, it will be appreciated that many modifications and changes may be made by those skilled in the art without departing from the spirit of the invention. Any variation and derivation from the above description and figures are included in the scope of the present invention as defined by the claims. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

What is claimed is:

1. A visualization system comprising:
   a display arranged to display a representation of a real-world gaming area that includes at least one electronic gaming machine;
   at least one accelerometer that is fixed with respect to the display;
   one or more storage devices storing:
      EGM data indicative of an appearance of at least one real-world electronic gaming machine, and
      game data indicative of at least one game; and
   at least one processor, wherein instructions stored on the one or more storage devices, when executed, causes the at least one processor to:
      cause, responsive to changes in orientation of the display evident from data from the one or more accelerometers, the perspective of the representation of the real-world gaming area to change,
      add, responsive to receipt of user input, at least one virtual electronic gaming machine to the representation of the real-world gaming area, each virtual electronic gaming machine corresponding to stored EGM data representative of a real-world gaming machine, and each virtual electronic gaming machine implementing a game defined according to the stored game data; and
      facilitate selection, based on the user input, of a location and orientation of the at least one virtual electronic gaming machine, wherein the displayed representation of the real-world gaming area and the at least one virtual electronic gaming machine generate a mixed reality gaming area that depicts how the real-world gaming area will appear if at least one electronic gaming machine corresponding to the at least one virtual electronic gaming machine and implementing the game is added to the real-world gaming area.

2. The visualization system of claim 1, wherein the one or more storage devices store further instructions which, when executed, further cause the at least one processor to
   facilitate selection by a user of an electronic gaming machine type from a plurality of electronic gaming machine types for addition as the virtual electronic gaming machine or the virtual electronic gaming machines.

3. The visualization system of claim 1, wherein one or more storage devices store further instructions which, when executed, further cause the at least one processor to:
   cause a footprint marker representative of the at least one virtual electronic gaming machine to be displayed on the display;
   receive input indicative of a location and orientation of the footprint marker; and
   cause the at least one virtual electronic gaming machine to be added to the representation of the real-world gaming area in the location and orientation of the footprint marker indicated by the received input.

4. The visualization system of claim 1, wherein the one or more storage devices store further instructions which, when executed, further cause the at least one processor to
facilitate selection by a user of an electronic gaming machine bank from a plurality of types of electronic gaming machine banks for addition as a virtual bank of electronic gaming machines.

5. The visualization system of claim 1, wherein the one or more storage devices store further instructions which, when executed, further cause the at least one processor to:
receive information indicative of a selection of a virtual electronic gaming machine, and
add an additional instance of the virtual electronic gaming machine to the representation of the real-world gaming area.

6. The visualization system of claim 1, wherein the one or more storage devices store further instructions which, when executed, cause the at least one processor to:
receive information indicative of a selection of a change of type from a first type of virtual electronic gaming machine to a second type of virtual electronic gaming machine for a first virtual electronic gaming machine of the at least one virtual electronic gaming machine, and
cause the representation of the first virtual electronic gaming machine to change from the first type of virtual electronic gaming machine to the second type of virtual electronic gaming machine.

7. The visualization system of claim 1, wherein the one or more storage devices store further instructions which, when executed, cause the at least one processor to:
receive information indicative of a selection of a change of the game from a first game to a second game for a first virtual electronic gaming machine of the at least one virtual electronic gaming machine, and
cause the representation of the game for the first virtual electronic gaming machine to change from the first game to the second game responsive to the receipt of the information.

8. Non-transitory computer-readable media storing instructions which, when executed by one or more processors, cause the one or processors to:
cause a representation of a real-world gaming area that includes at least one electronic gaming machine to be displayed on a display;
receive data from one or more accelerometers that are fixed with respect to the display;
cause, responsive to changes in orientation of the display evident from data from the one or more accelerometers, the perspective of the representation of the real-world gaming area to change,
add, responsive to receipt of user input, at least one virtual electronic gaming machine to the representation of the real-world gaming area, each virtual electronic gaming machine corresponding to stored EGM data representative of a real-world gaming machine, and each virtual electronic gaming machine implementing a game defined according to stored game data; and
facilitate selection, based on the user input, of a location and orientation of the at least one virtual electronic gaming machine, wherein the displayed representation of the real-world gaming area and the at least one virtual electronic gaming machine generate a mixed reality gaming area that depicts how the real-world gaming area will appear if at least one electronic gaming machine corresponding to the at least one virtual electronic gaming machine and implementing the game is added to the real-world gaming area.

9. The non-transitory computer-readable media of claim 8, further storing additional computer-executable instructions which, when executed by the one or more processors, cause the one or more processors to facilitate selection by a user of an electronic gaming machine type from a plurality of electronic gaming machine types for addition as the virtual electronic gaming machine or the virtual electronic gaming machines.

10. The non-transitory computer-readable media of claim 8, further storing additional computer-executable instructions which, when executed by the one or more processors, cause the one or more processors to: cause a footprint marker representative of the at least one virtual electronic gaming machine to be displayed on the display;
receive input indicative of a location and orientation of the footprint marker; and
cause the at least one virtual electronic gaming machine to be added to the representation of the real-world gaming area in the location and orientation of the footprint marker indicated by the received input.

11. The non-transitory computer-readable media of claim 8, further storing additional computer-executable instructions which, when executed by the one or more processors, cause the one or more processors to facilitate selection by a user of an electronic gaming machine bank from a plurality of types of electronic gaming machine banks for addition as a virtual bank of electronic gaming machines.

12. The non-transitory computer-readable media of claim 8, further storing additional computer-executable instructions which, when executed by the one or more processors, cause the one or more processors to: receive information indicative of a selection of a virtual electronic gaming machine, and
add an additional instance of the virtual electronic gaming machine to the representation of the real-world gaming area.

13. The non-transitory computer-readable media of claim 8, further storing additional computer-executable instructions which, when executed by the one or more processors, cause the one or more processors to: receive information indicative of a selection of a change of type from a first type of virtual electronic gaming machine to a second type of virtual electronic gaming machine for a first virtual electronic gaming machine of the at least one virtual electronic gaming machine, and
cause the representation of the first virtual electronic gaming machine to change from the first type of virtual electronic gaming machine to the second type of virtual electronic gaming machine.

14. The non-transitory computer-readable media of claim 8, further storing additional computer-executable instructions which, when executed by the one or more processors, cause the one or more processors to:
receive information indicative of a selection of a change of the game from a first game to a second game for a first virtual electronic gaming machine of the at least one virtual electronic gaming machine, and
cause the representation of the game for the first virtual electronic gaming machine to change from the first game to the second game responsive to the receipt of the information.

15. A method comprising:
causing a representation of a real-world gaming area that includes at least one electronic gaming machine to be displayed on a display;

receiving data from one or more accelerometers that are fixed with respect to the display;

causing, responsive to changes in orientation of the display evident from data from the one or more accelerometers, the perspective of the representation of the real-world gaming area to change, adding, responsive to receipt of user input, at least one virtual electronic gaming machine to the representation of the real-world gaming area, each virtual electronic gaming machine corresponding to stored EGM data representative of a real-world gaming machine, and each virtual electronic gaming machine implementing a game defined according to stored game data; and facilitating selection, based on the user input, of a location and orientation of the at least one virtual electronic gaming machine, wherein the displayed representation of the real-world gaming area and the at least one virtual electronic gaming machine generate a mixed reality gaming area that depicts how the real-world gaming area will appear if at least one electronic gaming machine corresponding to the at least one virtual electronic gaming machine and implementing the game is added to the real-world gaming area.

16. The method of claim 15, further comprising facilitating selection by a user of an electronic gaming machine type from a plurality of electronic gaming machine types for addition as the virtual electronic gaming machine or the virtual electronic gaming machines.

17. The method of claim 15, further comprising:

causing a footprint marker representative of the at least one virtual electronic gaming machine to be displayed on the display;

receiving input indicative of a location and orientation of the footprint marker; and causing the at least one virtual electronic gaming machine to be added to the representation of the real-world gaming area in the location and orientation of the footprint marker indicated by the received input.

18. The method of claim 15, further comprising facilitating selection by a user of an electronic gaming machine bank from a plurality of types of electronic gaming machine banks for addition as a virtual bank of electronic gaming machines.

19. The method of claim 15, further comprising:

receiving information indicative of a selection of a change of type from a first type of virtual electronic gaming machine to a second type of virtual electronic gaming machine for a first virtual electronic gaming machine of the at least one virtual electronic gaming machine, and causing the representation of the first virtual electronic gaming machine to change from the first type of virtual electronic gaming machine to the second type of virtual electronic gaming machine.

20. The method of claim 15, further comprising:

receiving information indicative of a selection of a change of the game from a first game to a second game for a first virtual electronic gaming machine of the at least one virtual electronic gaming machine, and causing the representation of the game for the first virtual electronic gaming machine to change from the first game to the second game responsive to the receipt of the information.

\* \* \* \* \*